US 9,702,963 B2

United States Patent
Kalliola et al.

(10) Patent No.: US 9,702,963 B2
(45) Date of Patent: Jul. 11, 2017

(54) METHOD, APPARATUS, AND COMPUTER PROGRAM PRODUCT FOR HIGH ACCURACY LOCATION DETERMINATION

(75) Inventors: Kimmo Kalliola, Helsinki (FI); Fabio Belloni, Espoo (FI); Antti Kainulainen, Espoo (FI); Ville Ranki, Espoo (FI); Eero Aho, Tampere (FI); Ruutu Jussi, Espoo (FI); Markku Oksanen, Helsinki (FI)

(73) Assignee: Nokia Technologies Oy, Espoo (FI)

( * ) Notice: Subject to any disclaimer, the term of this patent is extended or adjusted under 35 U.S.C. 154(b) by 635 days.

(21) Appl. No.: 13/483,851

(22) Filed: May 30, 2012

(65) Prior Publication Data

US 2013/0321209 A1    Dec. 5, 2013

(51) Int. Cl.
G01S 5/02 (2010.01)
G01S 13/82 (2006.01)
G01S 13/93 (2006.01)

(52) U.S. Cl.
CPC ............ *G01S 5/02* (2013.01); *G01S 13/825* (2013.01); *G01S 13/931* (2013.01); *G01S 2013/936* (2013.01); *G01S 2013/9314* (2013.01); *G01S 2013/9332* (2013.01); *G01S 2013/9339* (2013.01); *G01S 2013/9375* (2013.01); *G01S 2013/9378* (2013.01)

(58) Field of Classification Search
CPC .. G01S 2013/9314–2013/9396; G01S 13/931; G01S 5/02
See application file for complete search history.

(56) References Cited

U.S. PATENT DOCUMENTS

| | | | |
|---|---|---|---|
| 5,245,587 A | 9/1993 | Hutson | |
| 5,503,152 A * | 4/1996 | Oakley et al. | 600/447 |
| 6,741,207 B1 * | 5/2004 | Allison et al. | 342/371 |
| 7,295,154 B2 | 11/2007 | Walton et al. | |
| RE40,353 E | 6/2008 | Walcott, Jr. et al. | |
| 7,899,583 B2 | 3/2011 | Mendelson | |
| 8,217,368 B2 | 7/2012 | Meyers et al. | |
| 8,929,192 B2 * | 1/2015 | Kainulainen | G01S 3/48 342/147 |

(Continued)

OTHER PUBLICATIONS

R. Klukas et al., Line-of-sight angle of arrival estimation in the outdoor multipath environment, IEEE Transactions on Vehicular Technology, vol. 47(1), p. 342-351, 1998.*

(Continued)

*Primary Examiner* — Bernarr Gregory
*Assistant Examiner* — Fred H Mull
(74) *Attorney, Agent, or Firm* — Locke Lord LLP

(57) ABSTRACT

Method, apparatus, and computer program product example embodiments provide short-range communication based location finding. According to an example embodiment of the invention, a method comprises receiving, by a first transceiver of an apparatus mounted on a moveable platform, from a remote device, one or more wireless packets including information packets containing angle of arrival information from the remote device, wherein the moveable platform is in motion relative to the remote device; determining in the apparatus, at least a first angle of arrival from the received angle of arrival information; and generating distance estimation data in the apparatus relative to the remote device, based on the determined first angle of arrival.

13 Claims, 12 Drawing Sheets

(56) References Cited

U.S. PATENT DOCUMENTS

| | | |
|---|---|---|
| 2002/0089446 A1* | 7/2002 | Diggelen et al. ........ 342/357.13 |
| 2002/0128769 A1 | 9/2002 | Der Ghazarian et al. |
| 2004/0128331 A1 | 7/2004 | Hinds |
| 2004/0203904 A1 | 10/2004 | Gwon et al. |
| 2005/0107110 A1 | 5/2005 | Vasudevan et al. |
| 2006/0022866 A1* | 2/2006 | Walton et al. ................. 342/194 |
| 2007/0121560 A1 | 5/2007 | Edge |
| 2007/0147519 A1 | 6/2007 | Takayama et al. |
| 2007/0197229 A1 | 8/2007 | Kalliola et al. |
| 2008/0002858 A1* | 1/2008 | Devir ........................... 382/109 |
| 2008/0100502 A1 | 5/2008 | Jantunen et al. |
| 2008/0204322 A1 | 8/2008 | Oswald et al. |
| 2009/0043504 A1 | 2/2009 | Bandyopadhyay et al. |
| 2009/0054076 A1 | 2/2009 | Evennou et al. |
| 2010/0106745 A1 | 4/2010 | Cho et al. |
| 2010/0167731 A1 | 7/2010 | Horodezky et al. |
| 2010/0222081 A1 | 9/2010 | Ward et al. |
| 2010/0302102 A1 | 12/2010 | Desai et al. |
| 2011/0260859 A1 | 10/2011 | Maurer |
| 2012/0007779 A1 | 1/2012 | Klepal et al. |
| 2012/0044265 A1 | 2/2012 | Khorashadi et al. |
| 2012/0149415 A1 | 6/2012 | Valaee et al. |
| 2012/0178471 A1* | 7/2012 | Kainulainen ......... G01S 5/0009 455/456.1 |
| 2012/0257604 A1* | 10/2012 | Honkanen ............. H04W 4/023 370/338 |
| 2013/0162481 A1 | 6/2013 | Parvizi et al. |
| 2013/0188538 A1* | 7/2013 | Kainulainen ............. G01S 3/48 370/310 |
| 2013/0195314 A1 | 8/2013 | Wirola et al. |
| 2014/0093005 A1 | 4/2014 | Xia et al. |
| 2014/0347985 A1 | 11/2014 | Yi et al. |
| 2015/0092584 A1 | 4/2015 | Jung et al. |

OTHER PUBLICATIONS

A.P. Subramanian et al., Drive-By Localization of Roadside WiFi Networks, IEEE Conference on Computer Communications, 2008.*

M. Honkanen et al., Low end extension for Bluetooth, IEEE Radio and Wireless Conference, p. 199-202, Sep. 2004.*

Bouet, M. et al., "RFID tags: Positioning principles and localization techniques", in Proceedings of the 1st IFIP Wireless Days Conference, Nov. 24-27, 2008, United Arab Emirates. abstract; section III, par. 2, 7, section IV, par. 5; Fig. 2.

International Search Report for International Application No. PCT/IB2013/054307 mailed Oct. 4, 2013.

A. Subramanian, et al.; Drive-By Localization of Roadside WiFi Networks; INFOCOM 2008, 27th Conf. on Computer Communication, IEEE, Stony Brook University, Stony Brook, NY; Apr. 13-18, 2008, pp. 718-725.

L. Serrano, et al; Multipath Minimization Method; Innovation-Algorithms & Methods; GPS World; Jul. 2011; www.gpsworld.com; pp. 42-48.

Extended European Search Report for EP Application No. 13796637.0-1812, Dated Dec. 8, 2015, 11 pages.

Gezici, S. et al., "Localization via ultra-wideband radios", IEEE Signal Processing Magazine, vol. 22, No. 4, Jul. 1, 2005, pp. 70-84.

Golyandina et al; Analysis of Time Series Structure SSA and Related Techniques; CRC Press, 2001, chapter 4.

* cited by examiner

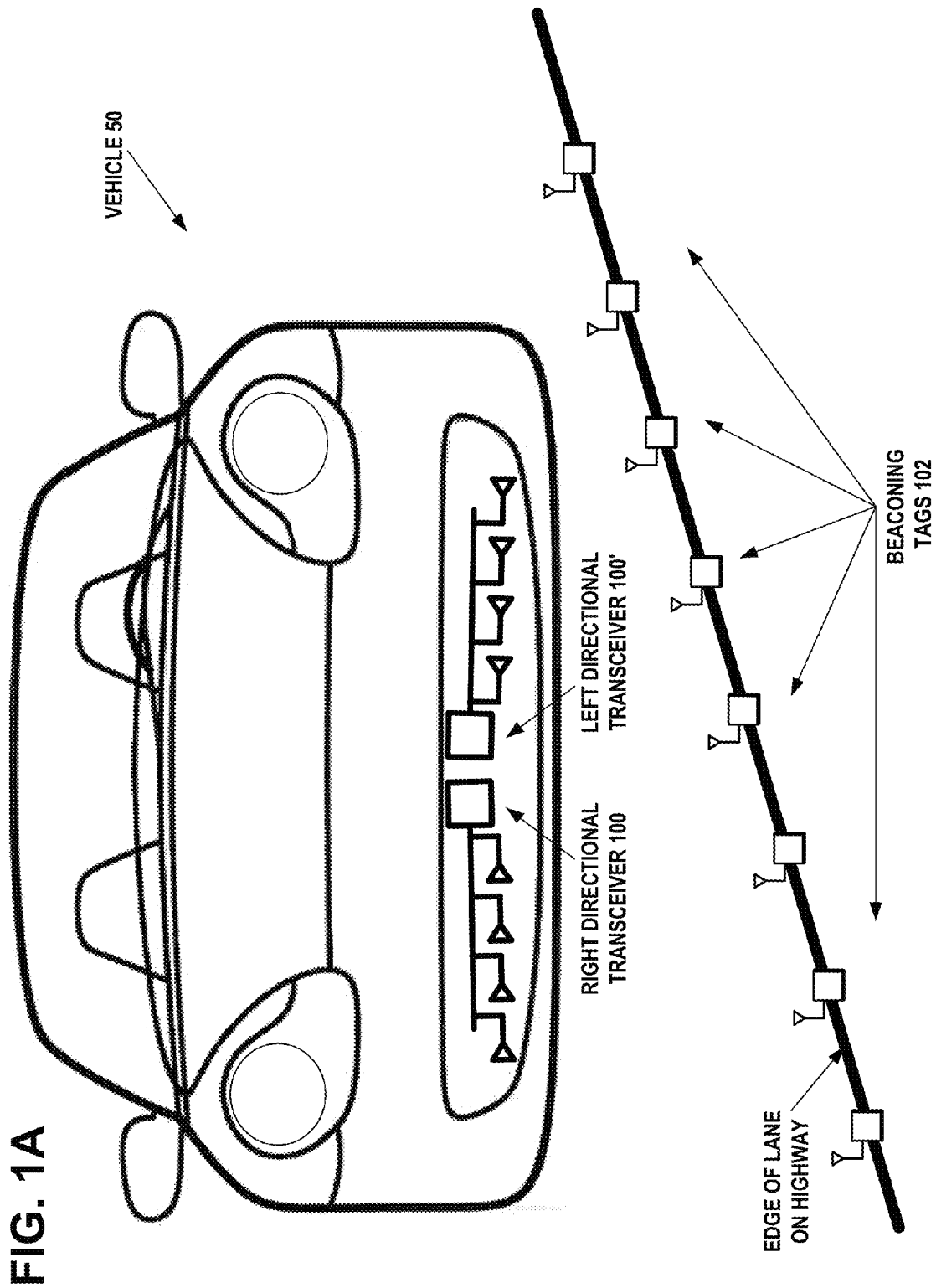

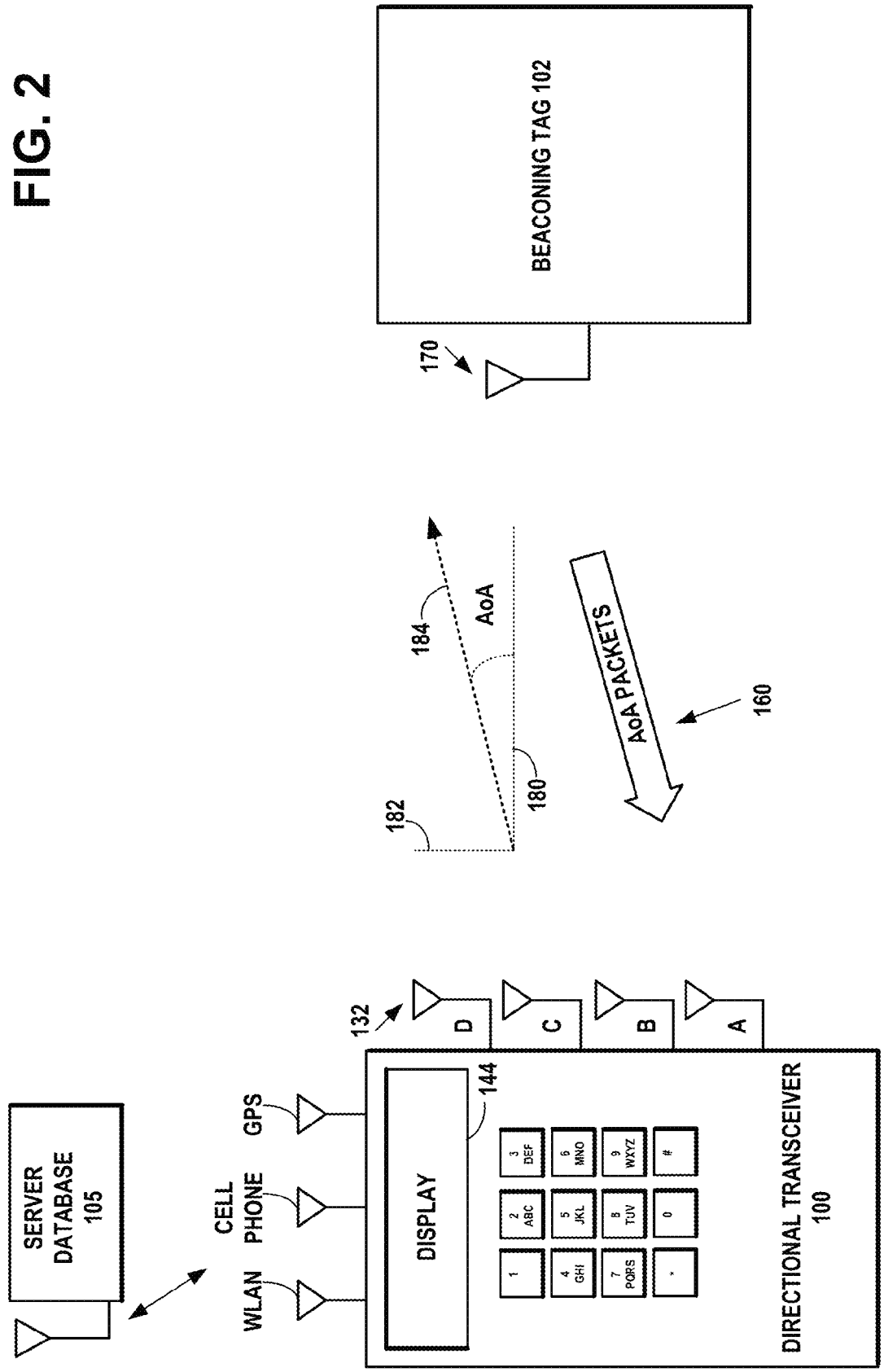

ANGLE OF ARRIVAL (AoA) ESTIMATION

ANGLE OF ARRIVAL (AOA) ESTIMATION: SAMPLE PHASE AND AMPLITUDE WITH ANTENNA SWITCHING TO DETERMINE AOA

ANGLE OF ARRIVAL (AoA) ESTIMATION

ANGLE OF ARRIVAL (AoA) ESTIMATION

ANGLE OF ARRIVAL (AoA) ESTIMATION

METHOD, APPARATUS, AND COMPUTER PROGRAM PRODUCT FOR HIGH ACCURACY LOCATION DETERMINATION

FIELD

The field of the invention relates to wireless short-range communication and more particularly to short-range communication based location finding.

BACKGROUND

Modern society has adopted, and is becoming reliant upon, wireless communication devices for various purposes, such as connecting users of the wireless communication devices with other users. Wireless communication devices can vary from battery powered handheld devices to stationary household and/or commercial devices utilizing an electrical network as a power source. Due to rapid development of the wireless communication devices, a number of areas capable of enabling entirely new types of communication applications have emerged.

Cellular networks facilitate communication over large geographic areas. These network technologies have commonly been divided by generations, starting in the late 1970s to early 1980s with first generation (1G) analog cellular telephones that provided baseline voice communications, to modern digital cellular telephones. GSM is an example of a widely employed 2G digital cellular network communicating in the 900 MHZ/1.8 GHZ bands in Europe and at 850 MHz and 1.9 GHZ in the United States. While long-range communication networks, like GSM, are a well-accepted means for transmitting and receiving data, due to cost, traffic and legislative concerns, these networks may not be appropriate for all data applications.

Short-range communication technologies provide communication solutions that avoid some of the problems seen in large cellular networks. Bluetooth™ is an example of a short-range wireless technology quickly gaining acceptance in the marketplace. In addition to Bluetooth™ other popular short-range communication technologies include Bluetooth™ Low Energy, IEEE 802.11 wireless local area network (WLAN), Wireless USB (WUSB), Ultra Wideband (UWB), ZigBee (IEEE 802.15.4, IEEE 802.15.4a), and ultra-high frequency radio frequency identification (UHF RFID) technologies. All of these wireless communication technologies have features and advantages that make them appropriate for various applications.

Perhaps the best-known example of wireless personal area network (PAN) technology is the Bluetooth™ Standard, which operates in the 2.4 GHz ISM band. Bluetooth is a short-range radio network, originally intended as a cable replacement. Bluetooth Technical Specifications are published by the Bluetooth SIG, Inc. Bluetooth Specification version 2.0+EDR, published Oct. 15, 2004 has the original functional characteristics of the first version Bluetooth Basic Rate (BR) and adds the Enhanced Data Rate (EDR) feature. Bluetooth Specification version 2.1+EDR, published Jul. 26, 2007 for Basic Rate/Enhanced Data Rate (BR/EDR), added definitions for new features: Encryption Pause Resume, Erroneous Data reporting, Extended Inquiry Response, Link Supervision Timeout Event, Packet Boundary Flag, Secure Simple Pairing, Sniff Subrating. Bluetooth Specification version 3.0+HS, published Apr. 21, 2009, updated the standard to integrate the Alternate MAC/PHY and Unicast Connectionless Data features.

On Apr. 20, 2009, Bluetooth SIG presented the new Bluetooth™ Low Energy protocol. Bluetooth Low Energy (LE) is a communication protocol directed to optimize power consumption of devices while being connected to other devices. The Bluetooth Low Energy packets include a preamble used for radio synchronization, an access address used for physical link identification, a shorter protocol data unit (PDU) to carry the payload data and the PDU header information, and a cyclic redundancy code (CRC) to ensure correctness of the data in the PDU.

On Jun. 30, 2010, the Bluetooth™ SIG published the Bluetooth Core Specification, Version 4.0 that includes the Bluetooth Low Energy (LE) protocol for products that require lower power consumption, lower complexity, and lower cost than would be possible using the BR/EDR protocol. Bluetooth LE is designed for applications requiring lower data rates and shorter duty cycles, with a very-low power idle mode, a simple device discovery, and short data packets. Bluetooth LE devices employ a star topology, where one device serves as a master for a plurality of slave devices, the master dictating connection timing by establishing the start time of the first connection event and the slave devices transmitting packets only to the master upon receiving a packet from the master. According to Bluetooth LE communication protocol all connections are point-to-point connections between two devices (the master and the slave).

SUMMARY

Method, apparatus, and computer program product example embodiments provide short-range communication based location finding.

In an example embodiment of the invention, a method comprises:

receiving, by a first transceiver of an apparatus mounted on a moveable platform, from a remote device, one or more wireless packets including information packets containing angle of arrival information from the remote device, wherein the moveable platform is in motion relative to the remote device;

determining at least a first angle of arrival from the received angle of arrival information; and generating distance estimation data in the apparatus relative to the remote device, based on the determined first angle of arrival.

In an example embodiment of the invention, a method comprises:

determining the first angle of arrival using a first antenna array of the first transceiver receiving the information packets.

In an example embodiment of the invention, a method comprises:

determining the first angle of arrival when the first transceiver receives the information packets in an antenna array of the first transceiver when the apparatus is at a first location and determining a second angle of arrival when the first transceiver receives the information packets in the antenna array when the apparatus is at a second location, the first location being spatially separate from the second location.

In an example embodiment of the invention, a method comprises:

calculating distance estimation data based on a difference between the first angle of arrival and second angle of arrival.

In an example embodiment of the invention, a method comprises:

receiving, by a second transceiver of the apparatus mounted on the moveable platform, from the remote device, the one or more wireless packets including information packets containing the angle of arrival information from the remote device, wherein the second transceiver is spatially separate from the first transceiver;

determining a second angle of arrival from the received angle of arrival information; and calculating distance estimation data based on a difference between the first angle of arrival and second angle of arrival.

In an example embodiment of the invention, a method comprises:

wherein the first transceiver receives the information packets in a first antenna array and the second transceiver receives the information packets in a second antenna array spatially separated from the first antenna array.

In an example embodiment of the invention, a method comprises:

calculating distance estimation data based on a difference between the first angle of arrival and second angle of arrival and geographical coordinates obtained from a sensor.

In an example embodiment of the invention, a method comprises:

calculating distance estimation data based on a difference between the first angle of arrival and second angle of arrival and geographical coordinates obtained from a database.

In an example embodiment of the invention, an apparatus comprises:

at least one processor;

at least one memory including computer program code;

the at least one memory and the computer program code configured to, with the at least one processor, cause the apparatus at least to:

receive, by a first transceiver of the apparatus mounted on a moveable platform, from a remote device, one or more wireless packets including information packets containing angle of arrival information from the remote device, wherein the moveable platform is in motion relative to the remote device;

determine at least a first angle of arrival from the received angle of arrival information; and generate distance estimation data in the apparatus relative to the remote device, based on the determined first angle of arrival.

In an example embodiment of the invention, an apparatus comprises:

the at least one memory and the computer program code configured to, with the at least one processor, cause the apparatus at least to:

determine the first angle of arrival using a first antenna array of the first transceiver receiving the information packets.

In an example embodiment of the invention, an apparatus comprises:

the at least one memory and the computer program code configured to, with the at least one processor, cause the apparatus at least to:

determine the first angle of arrival when the first transceiver receives the information packets in an antenna array of the first transceiver when the apparatus is at a first location and determining a second angle of arrival when the first transceiver receives the information packets in the antenna array when the apparatus is at a second location, the firk location being spatially separate from the second location.

In an example embodiment of the invention, an apparatus comprises:

the at least one memory and the computer program code configured to, with the at least one processor, cause the apparatus at least to:

calculate distance estimation data based on a difference between the first angle of arrival and second angle of arrival.

In an example embodiment of the invention, an apparatus comprises:

the at least one memory and the computer program code configured to, with the at least one processor, cause the apparatus at least to:

receiving, by a second transceiver of the apparatus mounted on the moveable platform, from the remote device, the one or more wireless packets including information packets containing the angle of arrival information from the remote device, wherein the second transceiver is spatially separate from the first transceiver;

determining a second angle of arrival from the received angle of arrival information; and calculating distance estimation data based on a difference between the first angle of arrival and second angle of arrival.

In an example embodiment of the invention, an apparatus comprises:

wherein the first transceiver receives the information packets in a first antenna array and the second transceiver receives the information packets in a second antenna array spatially separated from the first antenna array.

In an example embodiment of the invention, an apparatus comprises:

calculating distance estimation data based on a difference between the first angle of arrival and second angle of arrival and geographical coordinates obtained from a sensor.

In an example embodiment of the invention, an apparatus comprises:

calculating distance estimation data based on a difference between the first angle of arrival and second angle of arrival and geographical coordinates obtained from a database.

In an example embodiment of the invention, a computer program product comprising computer executable program code recorded on a computer readable non-transitory storage medium, the computer executable program code comprising:

code for receiving, by a first transceiver of an apparatus mounted on a moveable platform, from a remote device, one or more wireless packets including information packets containing angle of arrival information from the remote device, wherein the moveable platform is in motion relative to the remote device;

code for determining in the apparatus, at least a first angle of arrival from the received angle of arrival information; and code for generating distance estimation data in the apparatus relative to the remote device, based on the determined first angle of arrival.

In an example embodiment of the invention, a computer program product comprises:

code for determining the first angle of arrival when the first transceiver receives the information packets in an antenna array of the first transceiver when the apparatus is at a first location and determining a second angle of arrival when the first transceiver receives the information packets in the antenna array when the apparatus is at a second location, the first location being spatially separate from the second location.

In an example embodiment of the invention, a computer program product comprises:

code for calculating distance estimation data based on a difference between the first angle of arrival and second angle of arrival.

In an example embodiment of the invention, a computer program product comprises:

code for receiving, by a second transceiver of the apparatus mounted on the moveable platform, from the remote device, the one or more wireless packets including information packets containing the angle of arrival information from the remote device, wherein the second transceiver is spatially separate from the first transceiver;

code for determining a second angle of arrival from the received angle of arrival information; and code for calculating distance estimation data based on a difference between the first angle of arrival and second angle of arrival.

The example embodiments of the invention provide short-range communication based location finding.

DESCRIPTION OF THE FIGURES

FIG. 1A illustrates an example embodiment of the invention, depicting an example vehicle that includes a transceiver cluster of two directional transceivers mounted on the front of the vehicle, for detecting angle of arrival radio signals from a plurality of stationary beaconing tags positioned along the edge of a lane of a highway traversed by the vehicle, in accordance with at least one embodiment of the present invention.

FIG. 2 illustrates an example embodiment of the invention, depicting an example network diagram showing the beaconing tag broadcasting angle of arrival information in packets that are received by the directional transceivers mounted on the vehicle, in accordance with at least one embodiment of the present invention.

DISCUSSION OF EXAMPLE EMBODIMENTS OF THE INVENTION

Figure 1B:
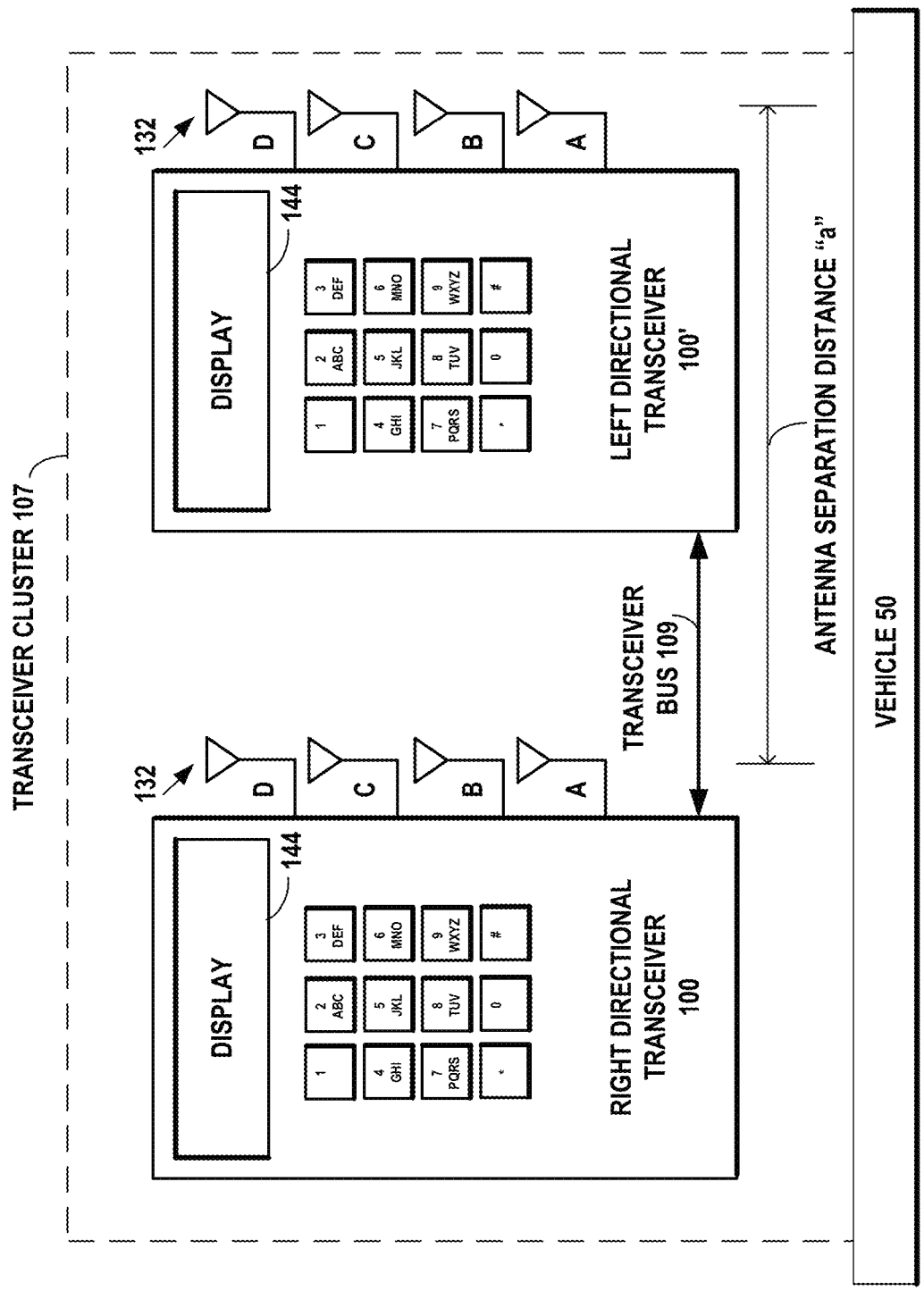
FIG. 1B illustrates an example embodiment of the invention, depicting the transceiver cluster of two directional transceivers mounted on the front of the vehicle of FIG. 1A, in accordance with at least one embodiment of the present invention.

This section is organized into the following topics:
I. Bluetooth™ Low Energy (LE) Technology
II. Direction Estimation
A. Angle of Arrival (AoA)
III. High Accuracy Location Determination
I. Bluetooth™ Low Energy (LE) Technology The Bluetooth Core Specification, Version 4.0 includes the Bluetooth LE protocol for products that require lower power consumption, lower complexity, and lower cost than would be possible using the BR/EDR protocol. Bluetooth LE is designed for applications requiring lower data rates and shorter duty cycles, with a very-low power idle mode, a simple device discovery, and short data packets. Bluetooth LE devices may employ a star topology, where one device serves as a master for a plurality of slave devices, the master dictating connection timing by establishing the start time of the first connection event and the slave devices transmitting packets only to the master upon receiving a packet from the master. According to Bluetooth LE communication protocol all connections are point-to-point connections between two devices (the master and the slave).

The Bluetooth LE protocol allows a star network topology in connections, where one device serves as a master for a plurality of slave devices. The master device dictates the connection timing and communication operations of the one or more slave devices. Bluetooth LE communicates over a total of 40 RF channels, each having a bandwidth of 2 MHz. Data communication between Bluetooth LE devices occurs in 37 pre-specified data channels, of the 40 RF channels. All data connection transmissions occur in connection events wherein a point-to-point connection is established between the master device and a slave device. In the Bluetooth LE protocol, a slave device provides data through Bluetooth LE communication to the master device to which it is connected. The remaining 3 channels, of the 40 RF channels, are advertising channels used by devices to advertise their existence and capabilities. The Bluetooth LE protocol defines a unidirectional connectionless broadcast mode on the advertising channels.

The Link Layer provides a state machine with the following five states: Standby State, Advertising State, Scanning State, Initiating State, and Connection State. The Link Layer state machine allows only one state to be active at a time. The Link Layer in the Standby State does not transmit or receive any packets and can be entered from any other state. The Link Layer in the Advertising State will be transmitting advertising channel packets and possibly listening to and responding to responses triggered by these advertising channel packets. A device in the Advertising State is known as an advertiser. The Advertising State can be entered from the Standby State. The Link Layer in the Scanning State will be listening for advertising channel packets from devices that are advertising. A device in the Scanning State is known as a scanner. The Scanning State can be entered from the Standby State. The Link Layer in the Initiating State will be listening for advertising channel packets from a specific device and responding to these packets to initiate a connection with that specific device. A device in the Initiating State is known as an initiator. The Initiating State can be entered from the Standby State. The Connection State of the Link Layer may be entered either from the Initiating State or the Advertising State. A device in the Connection State is known as being in a connection over a data channel. Within the Connection State, two roles are defined: the Master Role and the Slave Role. When a device in the Initiating State, enters the Connection State, it is in the Master Role, it exchanges data packets with a slave device in a data channel, and it defines the timings of transmissions. When a device in the Advertising State, enters the Connection State, it is in the Slave Role and exchanges data packets with a master device in a data channel, wherein the master device defines the timings of transmissions.

The Bluetooth LE radio operates in the unlicensed 2.4 GHz ISM band, in the same manner as does the Basic Rate/Enhanced Data Rate (BR/EDR) radio. Bluetooth LE supports very short data packets, from 8 octets to a maximum of 27 octets, giving it a low duty cycle. Bluetooth LE employs a frequency hopping transceiver with many frequency hopping spread spectrum (FHSS) carriers, with a bit rate of 1 Megabit per second (Mb/s).

Bluetooth LE employs two multiple access schemes: Frequency division multiple access (FDMA) and time division multiple access (TDMA). Forty (40) physical channels, separated by 2 MHz, are used in the FDMA scheme. Three (3) are used as advertising channels and 37 are used as data channels. A TDMA based polling scheme is used in which one device transmits a packet at a predetermined time and a corresponding device responds with a packet after a predetermined interval.

The physical channel is sub-divided into time units known as events. Data is transmitted between Bluetooth LE devices in packets that are positioned in these events. There are two types of events: Advertising and Connection events.

Devices that transmit advertising packets on the advertising Physical Layer (PHY) channels are referred to as advertisers. Devices that receive advertising on the advertising channels without the intention to connect to the advertising device are referred to as scanners. Devices that form a connection to another device by listening for connectable advertising packets, are referred to as initiators. Transmissions on the advertising PHY channels occur in advertising events.

In the Bluetooth Core Specification, Version 4.0, there are four advertising event types: connectable undirected advertising (ADV_IND), connectable directed advertising (ADV_DIRECT_IND), scannable undirected advertising (ADV_SCAN_IND), and non-connectable connectable undirected advertising (ADV_NONCONN_IND). At the start of each advertising event, the advertiser sends an advertising packet corresponding to the advertising event type. The scanner device, also referred to as the initiator device, that receives the advertising packet, may make a connect request (CONNECT_REQ) to the advertiser device on the same advertising PHY channel. The CONNECT_REQ request includes fields for access address AA, CRC, WinSize, WinOffset, Interval, Latency, Timeout, ChannelMap, Hop count, and sleep clock accuracy SCA. When the advertiser device accepts the CONNECT_REQ request, a point-to-point connection results between the scanner/initiator device that becomes the master device, and the advertiser device that becomes the slave device in a piconet. The master and the slave devices know at what time and in which frequency the connection is in operation. The data channel changes between every connection event and the start of connection events are spaced regularly with the connection interval that is provided in the CONNECT_REQ packet.

In the connectable undirected advertising (ADV_IND) channel packet, the ADV_IND PDU has a payload field containing AdvA and AdvData fields. The AdvA field contains the advertiser's public or random device address and the AdvData field may contain Advertising data from the advertiser's host. The PDU may be used in connectable undirected advertising events.

In the connectable directed advertising (ADV_DIRECT_IND) channel packet, the ADV_DIRECT_IND PDU has the payload field containing AdvA and InitA fields. The AdvA field contains the advertiser's public or random device address. The InitA field is the address of the device to which this PDU is addressed. The InitA field may contain the initiator's public or random device address. The PDU may be used in connectable directed advertising events. This packet may not contain any host data.

In a non-connectable undirected event type advertising channel packet, ADV_NONCONN_IND, a scanner device is allowed to receive information in the advertising channel packet, but scanner devices are not allowed to transmit anything in the advertising channels upon receiving the ADV_NONCONN_IND advertising channel packets. When the non-connectable undirected event type is used, non-connectable advertising indications ADV_NONCONN_IND packets are sent by the Link Layer. The non-connectable undirected event type allows a scanner to receive information contained in the ADV_NONCONN_IND from the advertiser. The advertiser may either move to the next used advertising channel index or close the advertising event after each ADV_NONCONN_IND that is sent.

In the scannable undirected advertising (ADV_SCAN_IND) channel packet, the ADV_SCAN_IND PDU has the payload field containing AdvA and AdvData fields. The AdvA field contains the advertiser's public or random device address. The PDU may be used in scannable undirected advertising events. The AdvData field may contain Advertising Data from the advertiser's host.

In the Bluetooth Core Specification, Version 4.0, if the advertiser is using a connectable advertising event, a scanner/initiator may make a connection request using the same advertising PHY channel on which it received the connectable advertising packet. The advertising event is ended and connection events begin if the advertiser receives and accepts the request for a connection to be initiated. Once a connection is established, the scanner/initiator becomes the master device in a piconet and the advertising device becomes the slave device. Within a connection event, the master and slave alternate sending data packets using the same data PHY channel.

Example non-limited use cases for Bluetooth LE technology include sports and fitness, security and proximity and smart energy. Bluetooth LE technology is designed for devices to have a battery life of up to one year such as those powered by coin-cell batteries. These types of devices include watches that will utilize Bluetooth LE technology to display Caller ID information and sports sensors that will be utilized to monitor the wearer's heart rate during exercise. The Medical Devices Working Group of the Bluetooth SIG is also creating a medical devices profile and associated protocols to enable Bluetooth applications for Bluetooth LE devices.

II. Direction Estimation

A. Angle of Arrival (AoA)

In angle of arrival (AoA) direction estimation, a directional transceiver wireless device includes an array of antennas arranged with a normal axis. For a linear antenna array along a linear axis of the directional transceiver, a normal axis perpendicular to the linear axis defines a plane with the linear antenna array. The apparent direction of reception of an AoA packet by the linear antenna array of the directional transceiver, as seen from a remote transmitting beaconing tag wireless device occupying the plane, may be represented by an observation vector. The angle between the observation vector and the normal axis is defined as the angle of arrival (AoA) of the signal as it approaches the antenna array of the directional transceiver. In embodiments, the antenna array of the directional transceiver may be arranged in a two-dimensional array in a plane and the normal axis is perpendicular to the plane of the antenna array. In this arrangement, the angle of arrival (AoA) is similarly defined as the angle between the observation vector and the normal axis to the plane. In embodiments, the antenna array of the directional transceiver may be arranged in any arbitrary manner, either in a linear array, a two-dimensional array, or a three dimensional array.

III. High Accuracy Location Determination

In an example embodiment of the invention, directional transceivers located on a moving platform may locate beaconing tags transmitting radio signals on stationary platforms or locate beaconing tags on another platform moving with respect to the tags. The radio signals are analyzed by a multi-antenna receiver, referred to herein as the Directional Transceiver or DT, and the direction of arrival of the signal is used to establish the position of the tags. The power consumption of the beaconing tag is very low compared to running a wireless local area network (WLAN) or Cellular radio, enabling operation for months or even years without battery replacement.

In an example embodiment of the invention, one or more directional transceivers (DT) may be located on a moving platform, such as an automobile, bus, tram, or other suitable moving platform. The moving platform and directional transceiver form a moving High Accuracy Indoor Positioning (HAIP) technology platform. The location information for a given tag may be a combination of the relative position of the tag with respect to the directional transceiver and the geographical location of the moving platform that carries the directional transceiver or transceivers. In accordance with an embodiment of the invention, the system may be used for relative positioning and/or direction finding.

In an example embodiment of the invention, location determination is based on radio direction finding. In an example embodiment of the invention, global positioning system (GPS) or similar location determination techniques may be used to determine the geographical location of the moving platform, however this may not be necessary if only relative position/direction from moving platform to a tag is to be determined. In an example embodiment of the invention, direction finding information may be combined with GPS location information to obtain geographical coordinates of the tags or of the moving platform with respect to the tags. In an example embodiment of the invention, location information may be communicated to or accessed from a central server over a wireless data connection such as GPRS, WLAN or 3G.

In an example embodiment of the invention, a tag and the platform carrying the tag, may be located by moving directional transceivers. Example use cases may include:

360 degree scanning DT on a bus, tram or train that knows position from GPS
    Snapshot of tags' locations when in range
        Any object could be located or locate itself in timely manner.
        E.g. cheap location device (tag) for people walking in city centrum
    Inventory management for non-moving objects
    Some busses may have cheap tags only. Those buses are located when passing buses with DT+GPS.

360 scanning on any road maintenance vehicle
    Tags are place in critical locations so that vehicle can route itself around them
    Typical application: Snow removal, high speed plowing of highways
    Tags located on road side markers (for snow removal).
    Tags can be placed to cars. Then a car with 360 degree monitoring system can find relative position of other cars, e.g. to detect a car in blind spot.

Parking aid system for vehicles
    Tags are placed to suitable locations e.g. to corners or pillars in a parking hall. By installing DTs to the front and back-end of the vehicle it is possible to warn the driver that he/she is too close to the wall, pillar or other structure and in danger of damaging the vehicle. Such as system could also be used to allow moving the vehicle with accurate angles e.g. when reversing in order to attach a trailer to the vehicle.

Front viewing scanning (180 degrees) on passenger vehicle
    Tags are placed on road lane indicators (traffic signs) such that correct lane can be indicated
    HAIP measurement information combined to GPS navigation data.
    Driver is given information about what lane they are on and what lane they should be, current navigators only tell you to turn left or right Could also be used staying in the lane in dark, or in bad weather conditions (heavy rain, snow, fog).

Follow the marked route: For example, in a big industrial area, tags can be placed to various main routes with a group identity. Then a navigator UI in a car can be tasked to show only the tags having the group identity for the requested route. (Equivalent to "Follow the blue line").

Elevators are one good place for moving DT, as it could tell the user the correct floor when he gets out. The system could also tell the user in which floor the elevator is going to stop next in order to preload map/calibration information.

Instead of having multiple DTs in the bus (or using movement), one could utilize several (fixed) tags to calculate the location (provided that the tags transmit their location, or they are otherwise known)

Also when utilizing two or more fixed tags with known location the orientation of the DT (and the vehicle) can be obtained in addition to the location. This is something that the normal fixed DT system doesn't provide.

Figure 3A:
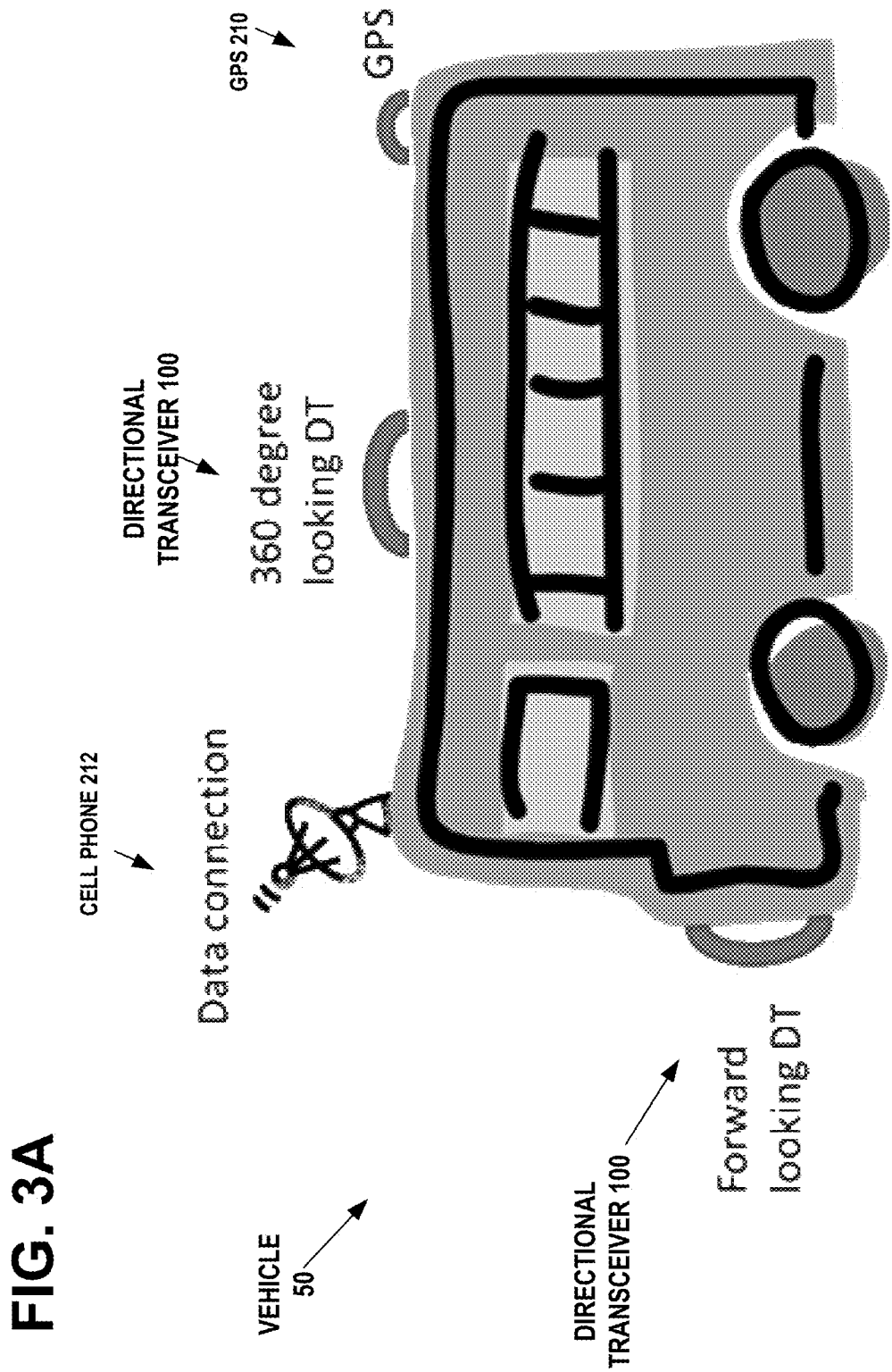
FIG. 3A illustrates an example embodiment of the invention, wherein a moving vehicle may have either forward looking or 360-degree antenna arrays, in accordance with an embodiment of the invention.

In an example embodiment of the invention, a moving vehicle may have either forward looking or all angles direction finding antennas as seen in FIG. 3A. In an example embodiment of the invention, the data connection may be needed for communicating the location of found tags to central server for access and statistics. In an example embodiment of the invention, the data connection may be needed for obtaining information from the databases as to where to expect tags on a route (similar to getting updated map information for navigation). In an example embodiment of the invention, GPS may be combined with position information obtained from directional transceivers to provide geographic location coordinates.

In accordance with an embodiment of the invention, two or more DTs may be mounted on a moving platform to locate a tag. In accordance with an embodiment of the invention, a single DT may be used in time sampled manner, wherein the same moving DT may take several samples at consecutive time intervals, from the same tag and thus, be able to estimate the tag location.

FIG. 1A illustrates an example embodiment of the invention, depicting an example vehicle 50, such as an automobile, that includes two directional transceivers (DT), a right DT 100 and a left DT 100', mounted on the front of the vehicle 50, for detecting angle of arrival radio signals from a plurality of stationary beaconing tags 102 positioned along the edge of a lane of a highway traversed by the vehicle, in accordance with at least one embodiment of the present invention. In an example embodiment of the invention, one or more directional transceivers (DT) may be located on a moving platform, such as an automobile, bus, tram, or other suitable moving platform.

In an example embodiment of the invention, a determination may be made by the first directional transceiver 100 on the vehicle 50, of a first angle of arrival and by a second directional transceiver 100' on the vehicle, of a second angle of arrival sent from the beaconing tag 102. The first directional transceiver 100 on the vehicle 50, has its antenna array separated by a known distance from the antenna array of the second directional transceiver 100' on the vehicle 50. Distance estimation data may be generated based on the determined first angle of arrival and second angle of arrival, to locate tags or to locate the moving vehicle in relation to tags.

FIG. 1B illustrates an example embodiment of the invention, depicting the transceiver cluster 107 of two directional transceivers 100 and 100' mounted on the front of the vehicle 50, of FIG. 1A, in accordance with at least one embodiment of the present invention. The directional transceivers 100 and 100' of the transceiver cluster 107 are functionally connected by the transceiver bus 109. The antenna array 132 of the first directional transceiver 100 is separated by a known distance "a" from the antenna array 132 of the second directional transceiver 100'. In an example embodiment of the invention, the first directional transceiver 100 determines a first angle of arrival AoA1 and the second directional transceiver 100' determines a second angle of arrival AoA2, derived from the radio signals sent from the beaconing tag 102. The second directional transceiver 100' may transmit its second angle of arrival AoA2 over the transceiver bus 109 to the first directional transceiver 100. The first directional transceiver 100 may then generate distance estimation data based on the determined first angle of arrival AoA1 and second angle of arrival AoA2, to locate tags or to locate the moving vehicle in relation to tags, in accordance with at least one embodiment of the present invention. In an example embodiment of the invention, FIG. 2 illustrates the server 105 that may be linked to the directional transceiver 100 over a cellular telephone link or a WLAN link. The first directional transceiver 100 may upload the determined first angle of arrival AoA1 and second angle of arrival AoA2 to the server 105. The server 105 may then generate distance estimation data based on the determined first angle of arrival AoA1 and second angle of arrival AoA2, to locate tags or to locate the moving vehicle in relation to tags, in accordance with at least one embodiment of the present invention. In an example embodiment of the invention, there may be more than two directional transceivers functionally connected by the transceiver bus 109 in the transceiver cluster 107 mounted on the vehicle 50. In an example embodiment of the invention, the transceiver cluster 107 may be mounted in other locations on the vehicle 50.

FIG. 2 illustrates an example embodiment of the invention, depicting an example network diagram showing one of the beaconing tag 102 shown in FIG. 1A, broadcasting angle of arrival information in packets 160 that are received by one of the directional transceivers 100 shown in FIG. 1A mounted on the vehicle, in accordance with at least one embodiment of the present invention. In an example embodiment of the invention, the directional transceiver 100 is mounted on the moveable platform, such as the vehicle 50 shown in FIG. 1A. The antenna array 132 of the directional transceiver 100 receives one or more wireless angle of arrival packets 160 from the remote beaconing tag 102. The wireless packets 160 are information packets containing angle of arrival information. As shown in FIG. 1A, the vehicle 50 is in motion relative to the remote beaconing tag 102. In an example embodiment of the invention, the directional transceiver 100 determines at least a first angle of arrival AoA from the received angle of arrival information. In an example embodiment of the invention, the directional transceiver 100 may then generate distance estimation data relative to the beaconing tag 102, based on the determined first angle of arrival of arrival AoA. In an example embodiment of the invention, FIG. 2 illustrates the server 105 that may be linked to the directional transceiver 100 over a cellular telephone link or a WLAN link. The first directional transceiver 100 may upload the determined first angle of arrival AoA to the server 105. The server 105 may then generate distance estimation data relative to the beaconing tag 102, based on the determined first angle of arrival of arrival AoA, in accordance with at least one embodiment of the present invention. FIG. 2 also illustrates the server database 105 that may be linked to the directional transceiver 100 over a cellular telephone link or a WLAN link, to enable the storage or accessing of geographical coordinates in the database 105.

Figure 2A:
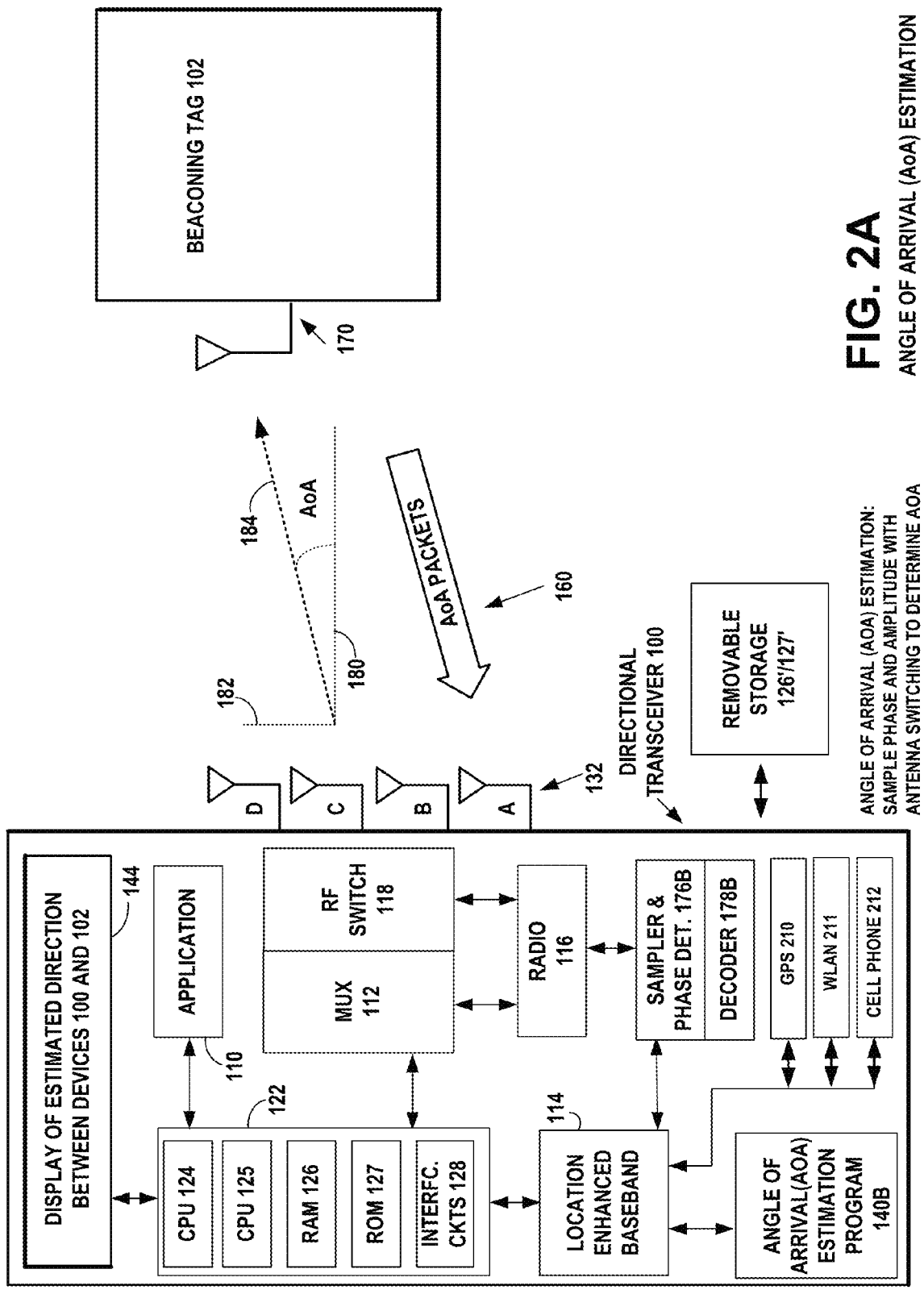
FIG. 2A illustrates an example embodiment of the invention, depicting an example of angle of arrival (AoA) estimation, showing an example network diagram of a beaconing tag having a single antenna transmitting angle of arrival packets to the directional transceiver mounted on the vehicle, the directional transceiver determining angle of arrival using an antenna array, in accordance with at least one embodiment of the present invention.

FIG. 2A illustrates an example embodiment of the invention, depicting an example of angle of arrival (AoA) estimation, showing an example network diagram of a beaconing tag having a single antenna transmitting angle of arrival AoA_DF_BCST packets 160, to a directional transceiver, the directional transceiver determining angle of arrival using an antenna array, in accordance with at least one embodiment of the present invention.

In an example embodiment of the invention, the beaconing tag 102 transmits the angle of arrival packet 160 that indicates to the directional transceiver 100 that it contains angle of arrival (AoA) information. The beaconing tag 102 transmits angle of arrival packets 160 to a directional transceiver 100, in accordance with at least one embodiment of the present invention. The angle of arrival packet 160 is broadcast as a direction finding broadcast (AoA_DF_BCST) packet.

In example embodiments of the invention, the four antennas A, B, C, and D of the antenna array 132 may be in a linear array or in an arbitrary array. An antenna array may be arranged in one, two, or three dimensions. For a linear array, the four antennas A, B, C, and D are mounted on the directional transceiver 100 and arranged along a linear axis 182. A normal axis 180 is shown perpendicular to the linear axis 182. The two axes 180 and 182 define a plane within which the angle of arrival (AoA) of the vector 184 lies, which will be the apparent direction of transmission of the reference data stream from the beaconing tag 102, as seen from the directional transceiver 100.

In an example embodiment of the invention, the directional transceiver 100 may include processor 122 that may include from one to many central processing units (CPUs) 124 and 125, a random access memory (RAM) 126, a read only memory (ROM) 127, and interface circuits 128 to interface with one or more radio transceivers 116, battery power source, keyboard, display 144, etc. The directional transceiver 100 may include a baseband 114 that processes received packets, such as angle of arrival packets 160 that are received by the radio 116. The radio 116 and baseband 114 may use the Bluetooth LE communications protocol. During reception, the multiplexer 112 directs the radio frequency (RF) signal from one of the antennas A, B, C, or D in the antenna array 132. The number of antennas in the antenna array is not limited to four, but may be any number suitable for the functions to be performed by embodiments of the invention.

Figure 2B:
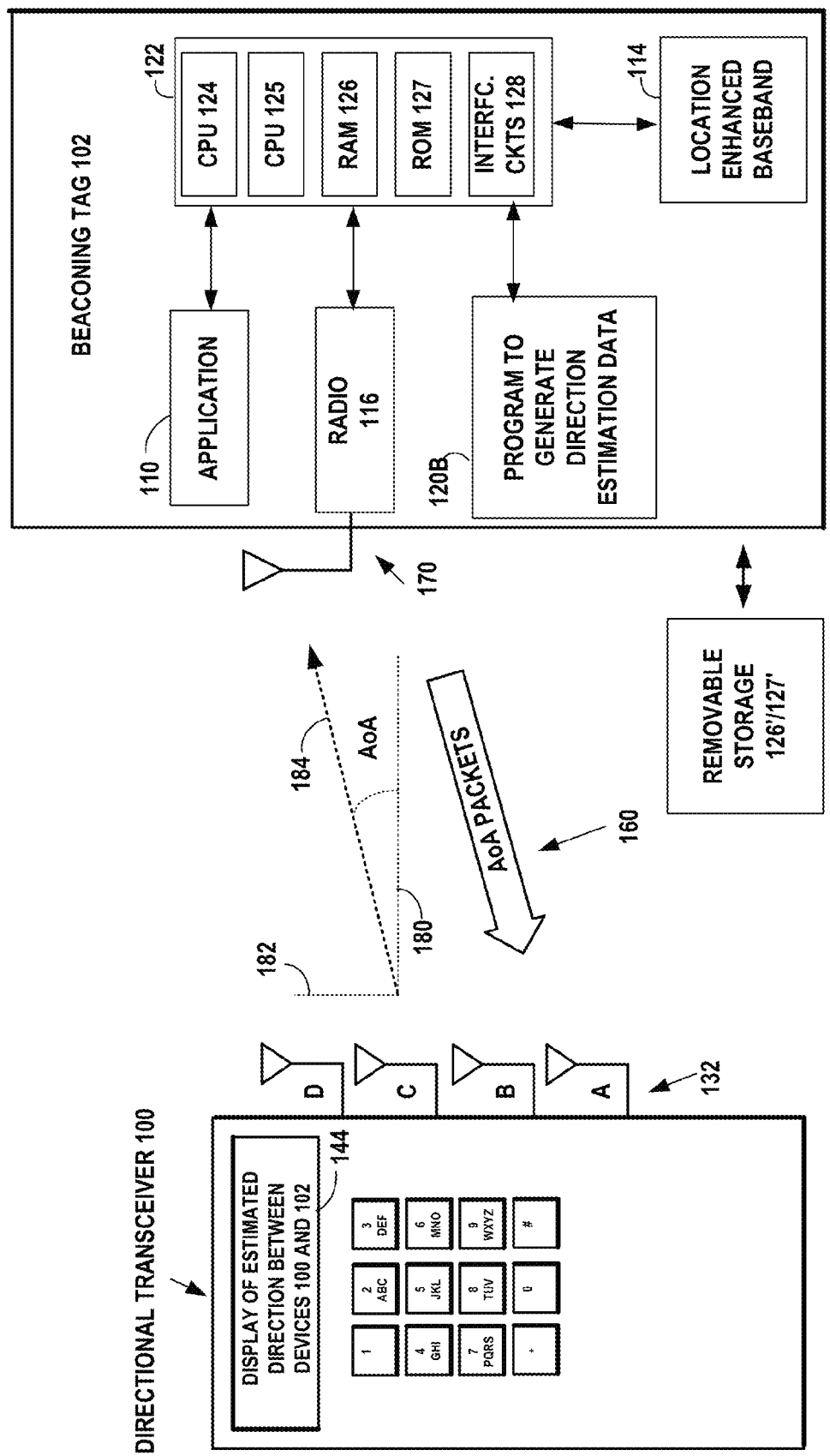
FIG. 2B illustrates an example embodiment of the invention, depicting the example network diagram of FIG. 2A, showing more details of the beaconing tag, in accordance with at least one embodiment of the present invention.
Figure 2C:
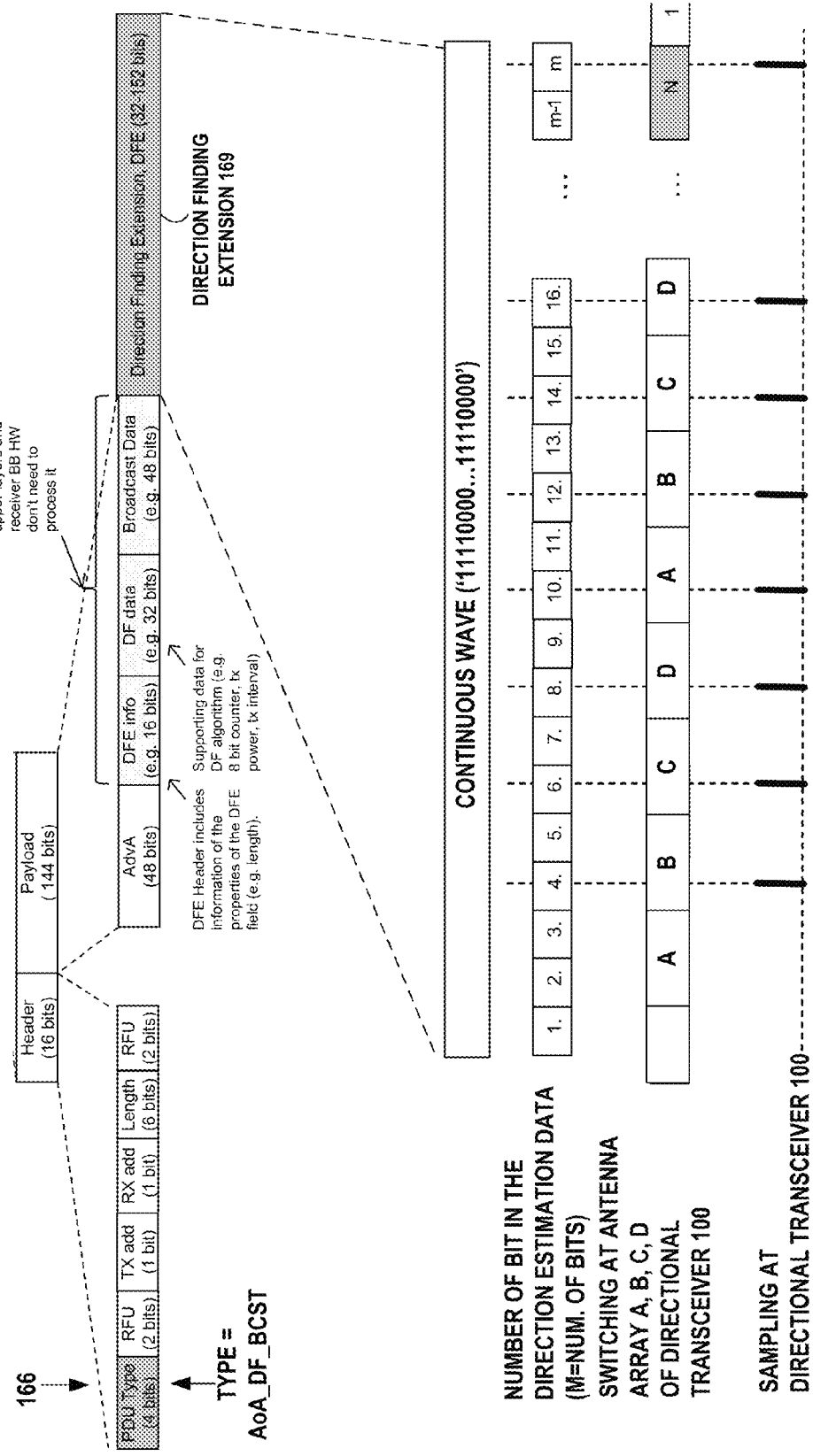
FIG. 2C illustrates an example embodiment of the invention, depicting an example of angle of arrival (AoA) estimation, showing an example AoA packet and how the bits in the reference pattern from the angle of arrival packet are transmitted by the single antenna at the beaconing tag and received by the antenna array and sampled at the directional transceiver, in accordance with at least one embodiment of the present invention.

In an example embodiment of the invention, the AoA_DF_BCST packet 160 may be a new type of Bluetooth LE advertising packet and the PDU Type field 166, shown in FIG. 2C, identifies the packet as carrying information relevant to angle of arrival direction finding. The angle of arrival packet 160 may include a reference binary bit pattern, such as "11110000". FIG. 2C illustrates an example of how the bits in the reference pattern from the angle of arrival AoA_DF_BCST packet 160 are transmitted by the single antenna 170 at the beaconing tag 102 and received by the antenna array 132 at the directional transceiver 100, in accordance with at least one embodiment of the present invention. FIG. 2C shows the continuous digital wave in the direction finding extension of the packet 160. The figure shows how the bits in the continuous digital wave are switched at the antennas A, B, C, D of the antenna array 132 at the directional transceiver 100, and the sampling at the directional transceiver 100 to extract the angle of arrival AoA.

In example embodiments of the invention, the angle of arrival packet 160 may include a data and length field, shown in FIG. 2C, that includes data such as coding, length of the direction finding extension data, and other factors useful in enabling the directional transceiver 100 to estimate a direction. The angle of arrival packet 160 may also include direction finding extension data, shown in FIG. 2C, that may comprise several concatenated segments of the binary bit pattern. In embodiments of the invention, the beaconing tag 102 transmits the angle of arrival packet 160 from the antenna 170. The direction finding extension data is transmitted as a reference data stream.

In example embodiments of the invention, the directional transceiver 100 may receive the angle of arrival AoA_DF_BCST packet 160. The angle of arrival (AoA) estimation is made by sampling the phase and amplitude of the reference bits of the direction finding extension data. As shown in FIG. 2A, the directional transceiver 100 includes a sampler and phase detector 176B, a decoder 178B, and an angle of arrival (AoA) estimation program 140B to estimate the angle of arrival (AoA) of the reference data stream, based on the angle of arrival packet 160 received from the beaconing tag 102.

The Bluetooth LE advertising packet 160 shown in FIG. 2C, includes a header (16 bits), payload (144 bits), and the direction finding extension (DFE) 169 of (32-152 bits). The payload includes an AdvA field (48 bits), a DFE info field (e.g., 16 bits), a DFE data field (e.g. 32 bits) and a broadcast data field (e.g. 48 bits). The DFE info field (also called DFE Header) includes information of the properties of the DFE field (e.g. length). The DFE data field supports data for DF algorithm (e.g. 8 bit counter, tx power, tx interval). The three fields (DFE info field, DFE data field, and broadcast data field) of the payload, have data for the upper layers and do not need to be processed by the receive baseband (BB) hardware (HW). It is the direction finding extension 169 that is sampled, as shown in the figure.

The directional transceiver 100 of FIG. 2A includes processor 122 that may access random access memory RAM 126 and/or read only memory ROM 127 in order to obtain stored program code and data for use during processing. RAM 126 or ROM 127 may generally include removable or imbedded memories that operate in a static or dynamic mode. Further, RAM 126 or ROM 127 may include rewritable memories such as Flash, EPROM, etc. Examples of removable storage media based on magnetic, electronic and/or optical technologies such as magnetic disks, optical disks, semiconductor memory circuit devices, and micro-SD memory cards are shown at 126'/127' and in FIG. 5, and may serve, for instance, as a program code and data input/output means. Code may include any interpreted or compiled computer language including computer-executable instructions. The code and/or data may be used to create software modules such as operating systems, communication utilities, user interfaces, more specialized program modules, etc. The directional transceiver 100 of FIG. 2A also includes a GPS sensor 210, WLAN transceiver circuits 211, and cell phone transceiver circuits 212.

FIG. 2B illustrates an example embodiment of the invention, depicting the example network diagram of FIG. 2A, showing more details of the beaconing tag 102, in accordance with at least one embodiment of the present invention. The beaconing tag 102 of FIG. 2B may include a baseband 114 that processes packets to be transmitted, such as angle of arrival packets 160 that are transmitted by the radio 116. The beaconing tag 102 of FIG. 2B includes the program 120B to generate the reference data stream inserted into the angle of arrival (AoA) packet 160 that is transmitted by the single antenna 170. The radio 116 and baseband 114 may use the Bluetooth LE communications protocol. The beaconing tag 102 of FIG. 2B includes processor 122 that may access random access memory RAM 126 and/or read only memory ROM 127 in order to obtain stored program code and data for use during processing. RAM 126 or ROM 127 may generally include removable or embedded memories that operate in a static or dynamic mode. Further, RAM 126 or ROM 127 may include rewritable memories such as Flash, EPROM, etc. Examples of removable storage media based on magnetic, electronic and/or optical technologies such as magnetic disks, optical disks, semiconductor memory circuit devices, and micro-SD memory cards are shown at 126'/127' and in FIG. 5, and may serve, for instance, as a program code and data input/output means. Code may include any interpreted or compiled computer language including computer-executable instructions. The code and/or data may be used to create software modules such as operating systems, communication utilities, user interfaces, more specialized program modules, etc.

FIG. 2C illustrates an example embodiment of the invention, depicting an example of angle of arrival (AoA) estimation, showing an example angle of arrival AoA_D-F_BCST packet 160 and how the bits in the reference pattern from the angle of arrival packet are transmitted by the single antenna at the beaconing tag and received by the antenna array and sampled at the directional transceiver, in accordance with at least one embodiment of the present invention. In an example embodiment of the invention, the AoA_D-F_BCST packet 160 may be a new type of Bluetooth LE advertising packet and the PDU Type field 166 identifies the packet as carrying information relevant to angle of arrival direction finding.

FIG. 3A illustrates an example embodiment of the invention, wherein a moving vehicle may have either forward looking or 360-degree antenna arrays, in accordance with an embodiment of the invention. In an example embodiment of the invention, one or more directional transceivers (DT) 100 may be located on a moving platform, such as an automobile, bus, tram, or other suitable moving platform.

Figure 3B:
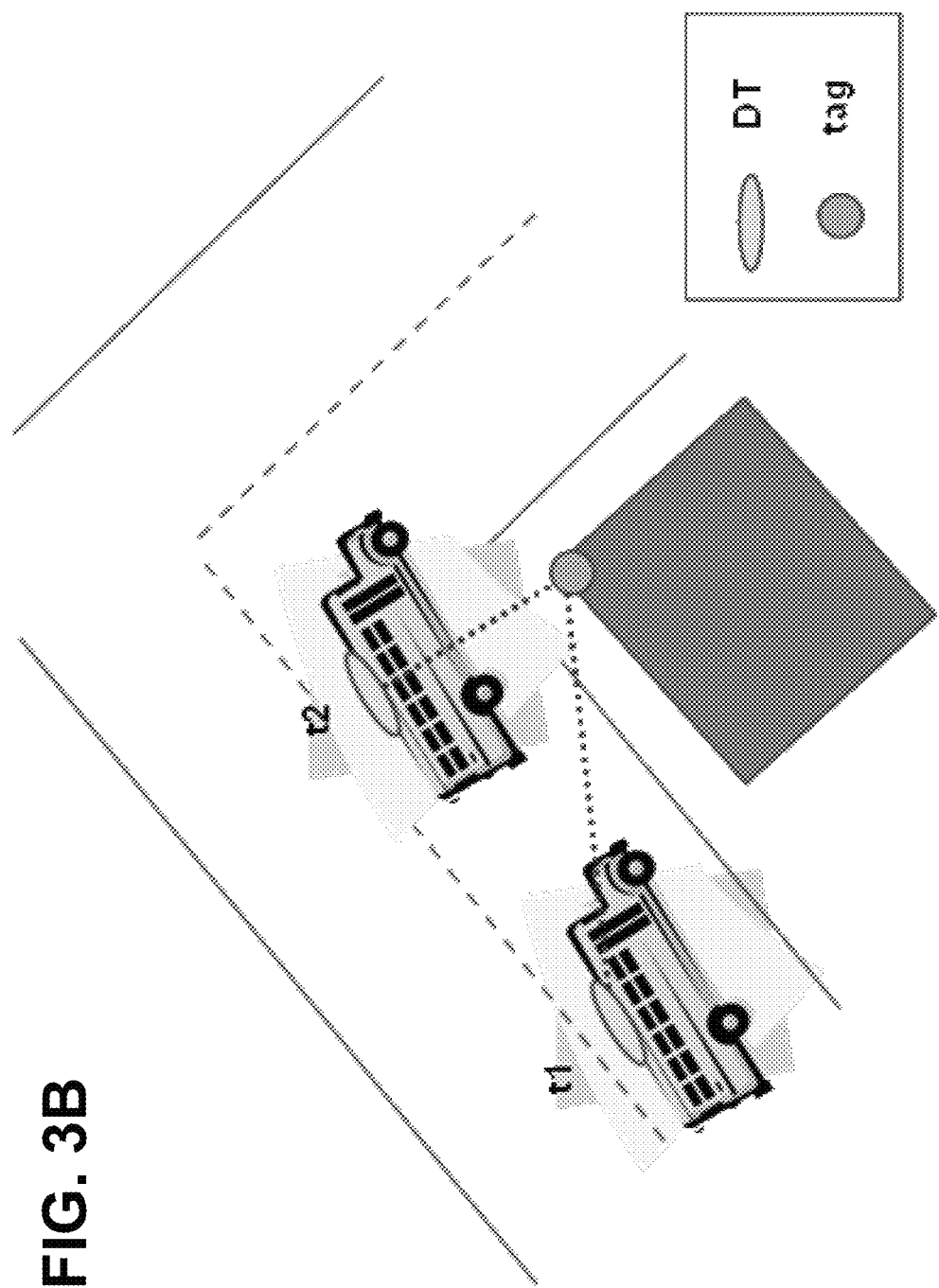
FIG. 3B illustrates an example embodiment of the invention, wherein a moving vehicle may have a single directional transceiver and signal samples may be received at consecutive time intervals, from the same tag to enable estimating the tag location, in accordance with an embodiment of the invention.

FIG. 3B illustrates an example embodiment of the invention, wherein a moving vehicle may have a single directional transceiver and signal samples may be received at consecutive time intervals, from the same tag to enable estimating the tag location, in accordance with an embodiment of the invention. In accordance with an embodiment of the invention, the directional transceiver 100 may determine a first angle of arrival when the directional transceiver 100 receives the information packets 160 in its antenna array 132 when the vehicle 50 is at a first location. The directional transceiver 100 may determine a second angle of arrival when its antenna array 132 receives the information packets 160 when the vehicle is at a second location, the first location being spatially separate from the second location.

Figure 3C:
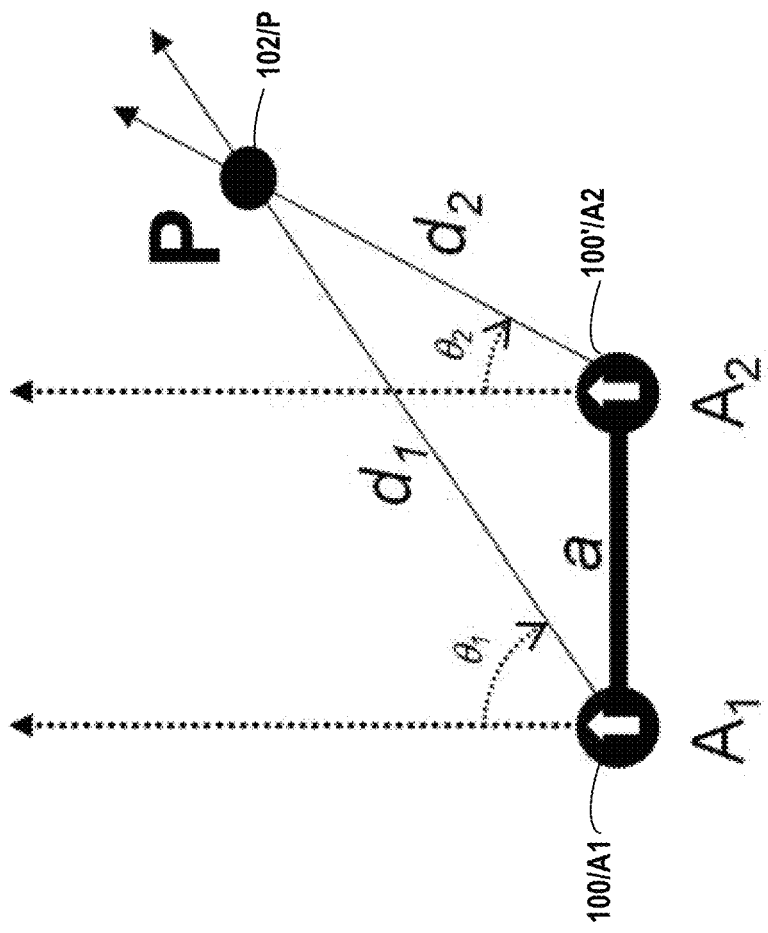
FIG. 3C illustrates an example embodiment of the invention, depicting a determination by a first directional transceiver on the moving platform, of a first angle of arrival and by a second directional transceiver on the moving platform, of a second angle of arrival sent from the beaconing tag and a generation of distance estimation data based on the determined first angle of arrival and second angle of arrival, wherein the first directional transceiver on the moving platform, has its antenna array separated by a known distance from the antenna array of the second directional transceiver on the moving platform, in accordance with at least one embodiment of the present invention.

FIG. 3C illustrates an example embodiment of the invention, depicting a determination by a first directional transceiver 100 on the moving platform 50, of a first angle of arrival and by a second directional transceiver 100' on the moving platform, of a second angle of arrival sent from the beaconing tag 102 and a generation of distance estimation data based on the determined first angle of arrival and second angle of arrival, wherein the first directional transceiver 100 on the moving platform 50, has its antenna array 132 separated by a known distance from the antenna array of the second directional transceiver 100' on the moving platform 50, in accordance with at least one embodiment of the present invention.

FIG. 3C illustrates an example embodiment of the invention, depicting a determination by the first directional transceiver 100/A1 of a first angle of arrival $f_1$ and the second directional transceiver 100'/A2 of a second angle of arrival $\theta_2$ sent from the beaconing tag 102/P and a generation of distance estimation data based on the determined first angle of arrival $\theta_1$ and second angle of arrival $\theta_2$, wherein the first directional transceiver 100/A1 that its antenna array separated by a known distance "a", from the antenna array of the second directional transceiver 100'/A2, in accordance with at least one embodiment of the present invention.

Each antenna array is separately capable of receiving the angle of arrival (AoA) packets 160 transmitted by the beaconing tag 102/P.

In example embodiments of the invention, based on the received angle of arrival (AoA) packets 160, the first directional transceiver 100/A1 and the second directional transceiver 100'/A2 may compute two directions $\theta_1$ and $\theta_2$ as shown in FIG. 3C.

In example embodiments of the invention, the distances d1 and d2 may now be defined using the law of sines:

$$d_1 = \frac{a\cos(\theta_2)}{\sin(\theta_1 - \theta_2)}$$

$$d_2 = \frac{a\cos(\theta_1)}{\sin(\theta_1 - \theta_2)}$$

Distance estimation data for distances d1 and d2 may be used to locate beaconing tags 102 or to locate the moving vehicle 50 in relation to the beaconing tags 102.

In an embodiment of the invention, calculating the distance estimation data may be based on the difference between the first angle of arrival and second angle of arrival and geographical coordinates obtained from the GPS sensor 210.

In an embodiment of the invention, calculating the distance estimation data may be based on the difference between the first angle of arrival and second angle of arrival and geographical coordinates obtained from the server database 105.

Figure 3D:
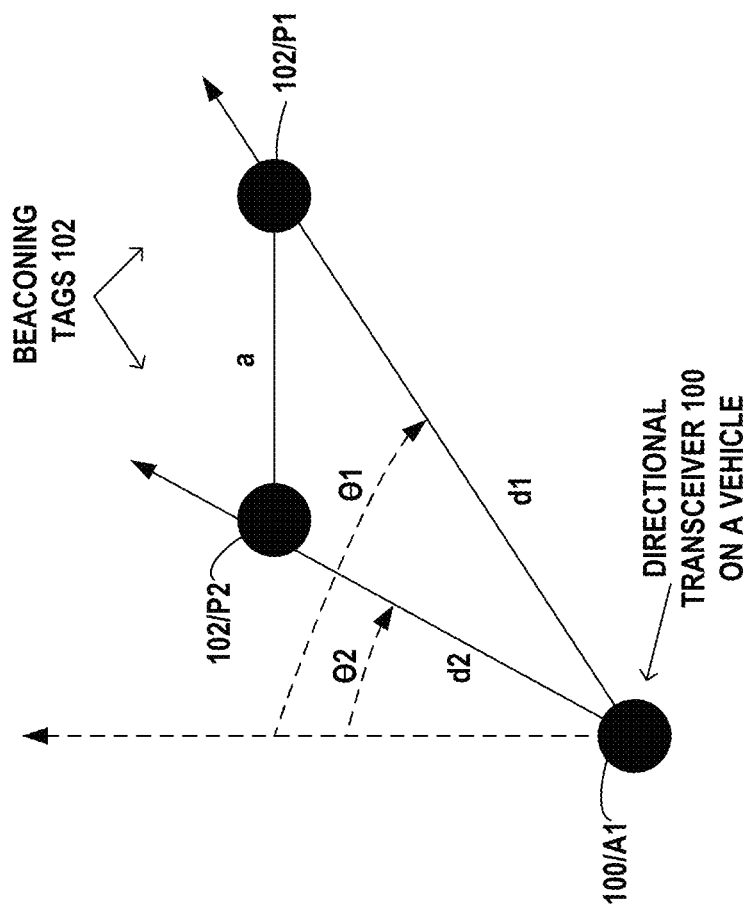
FIG. 3D illustrates an example embodiment of the invention, depicting a determination by single directional transceiver mounted on the moving platform, of a first angle of arrival from a first beaconing tag and a determination of a second angle of arrival from a second beaconing tag and a generation of distance estimation data based on the determined first angle of arrival and second angle of arrival, wherein the first beaconing tag is separated by a known distance "a" from the second beaconing tag, in accordance with at least one embodiment of the present invention.

FIG. 3D illustrates an example embodiment of the invention, depicting a determination by single directional transceiver 100/A1 mounted on the moving platform 50, of a first angle of arrival $\theta_1$ from a first beaconing tag 102/P1 and a determination of a second angle of arrival $\theta_2$ from a second beaconing tag 102/P2 and a generation of distance estimation data based on the determined first angle of arrival $\theta_1$ and second angle of arrival $\theta_2$, wherein the first beaconing tag 102/P1 is separated by a known distance "a" from the second beaconing tag 102/P2, in accordance with at least one embodiment of the present invention.

The antenna array is capable of receiving the angle of arrival (AoA) packets 160 transmitted by the beaconing tag 102/P1 and the beaconing tag 102/P2.

In example embodiments of the invention, based on the received angle of arrival (AoA) packets 160, the single directional transceiver 100/A1 mounted on the vehicle 50, may compute two directions $\theta_1$ and $\theta_2$ as shown in FIG. 3D.

In example embodiments of the invention, the distances d1 and d2 may now be defined using the law of sines:

$$d_1 = \frac{a\cos(\theta_2)}{\sin(\theta_1 - \theta_2)}$$

$$d_2 = \frac{a\cos(\theta_1)}{\sin(\theta_1 - \theta_2)}$$

Distance estimation data for distances d1 and d2 may be used to locate beaconing tags 102 or to locate the moving vehicle 50 in relation to the beaconing tags 102.

In an embodiment of the invention, calculating the distance estimation data may be based on the difference between the first angle of arrival and second angle of arrival and geographical coordinates obtained from the GPS sensor 210.

In an embodiment of the invention, calculating the distance estimation data may be based on the difference between the first angle of arrival and second angle of arrival and geographical coordinates obtained from the server database 105.

Figure 4:
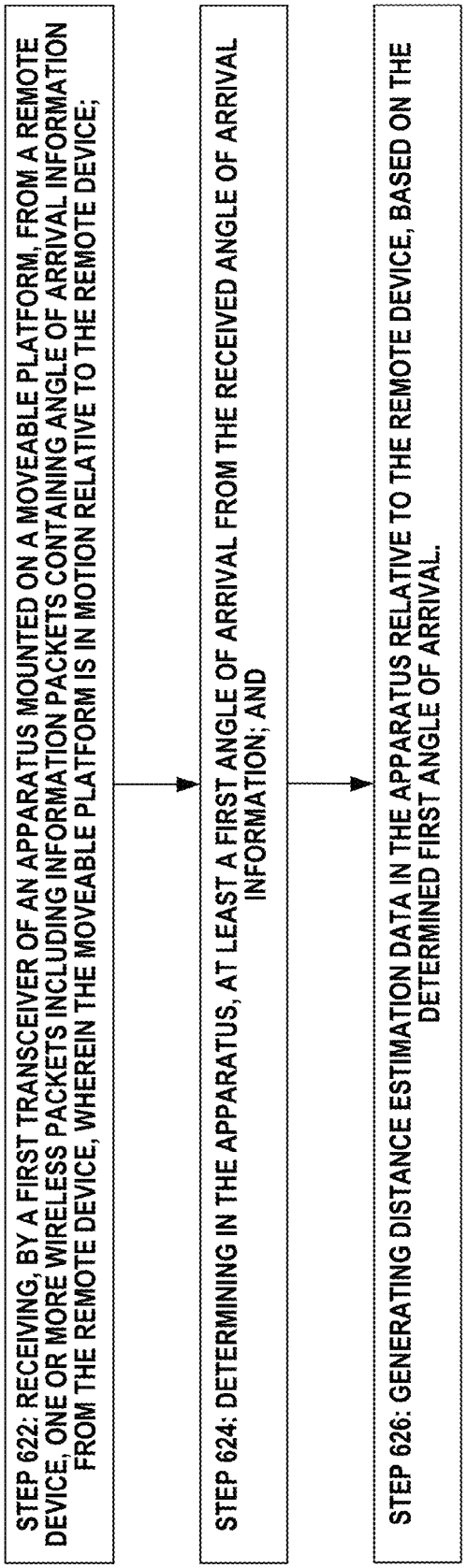
FIG. 4 illustrates an example embodiment of the invention, depicting an example flow diagram of an example method, from the point of view of the directional transceiver, in accordance with at least one embodiment of the present invention.

FIG. 4 illustrates an example embodiment of the invention, depicting an example flow diagram 620 of an example method, from the point of view of the directional transceiver 100, in accordance with at least one embodiment of the present invention. The steps of the flow diagram represent computer code instructions stored in the RAM memory of the device, which when executed by the central processing unit (CPU), carry out the functions of a example embodiment of the invention. Alternately, some or all of the steps in the procedure of the flow diagram may be embodied as hardware program logic included in programmed logic arrays of sequential and/or combinatorial logic circuits and/or state machine logic implementing some or all of the steps performed by embodiments of the invention. The steps may be carried out in another order than shown and individual steps may be combined or separated into component steps. The method includes the steps of:

Step 622: receiving, by a first transceiver of an apparatus mounted on a moveable platform, from a remote device, one or more wireless packets including information packets containing angle of arrival information from the remote device, wherein the moveable platform is in motion relative to the remote device;

Step 624: determining in the apparatus, at least a first angle of arrival from the received angle of arrival information; and Step 626: generating distance estimation data in the apparatus relative to the remote device, based on the determined first angle of arrival.

Figure 5:
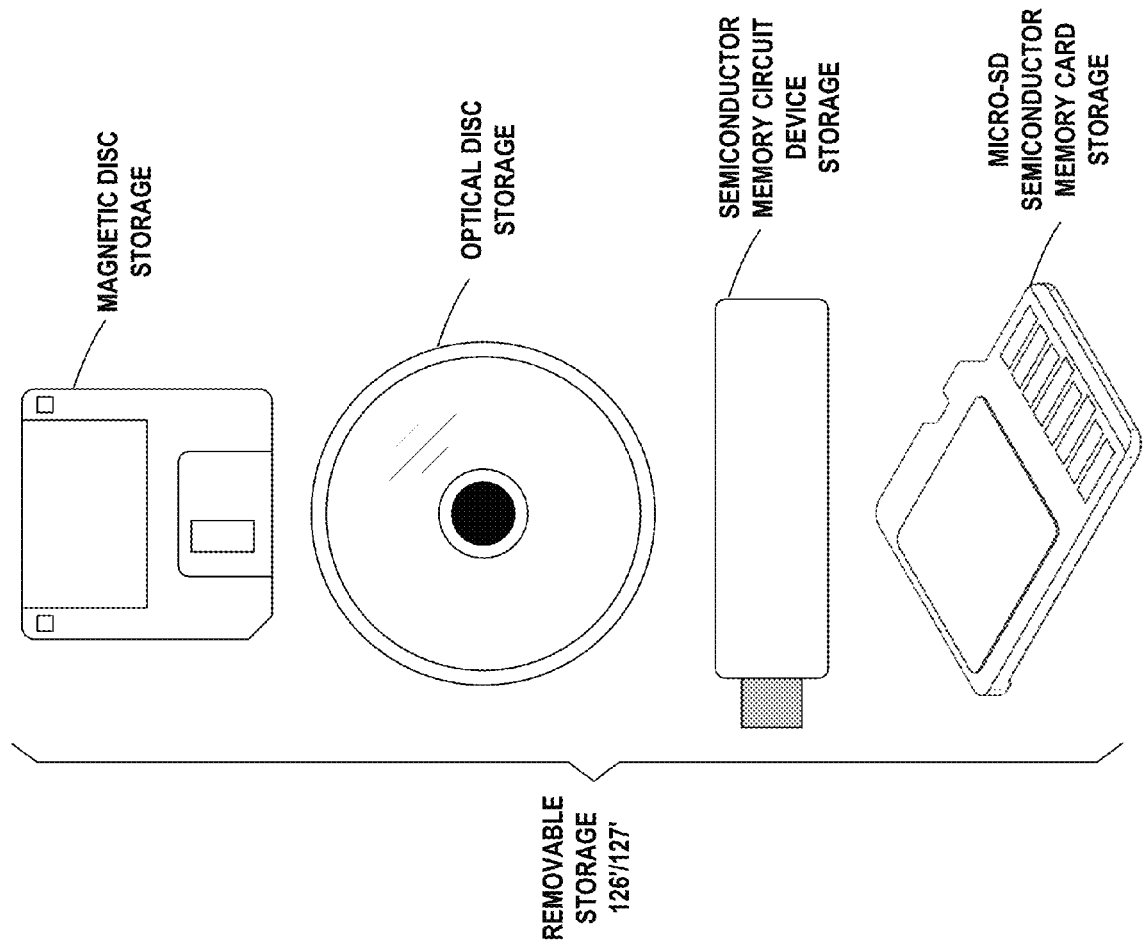
FIG. 5 illustrates an example embodiment of the invention, wherein examples of removable storage media are shown, based on magnetic, electronic and/or optical technologies, such as magnetic disks, optical disks, semiconductor memory circuit devices, and micro-SD memory cards for storing data and/or computer program code as an example computer program product, in accordance with at least one embodiment of the present invention.

FIG. 5 illustrates an example embodiment of the invention, wherein examples of removable storage media are shown, based on magnetic, electronic and/or optical technologies, such as magnetic disks, optical disks, semiconductor memory circuit devices, and micro-SD memory cards for storing data and/or computer program code as an example computer program product, in accordance with at least one embodiment of the present invention.

In an example embodiment of the invention, the radio 116 and baseband 114 may use any of a variety of wireless personal area, wireless local area, or wireless wide area radio communications protocols, such as Land Mobile Radio, Professional Mobile Radio, DECT (Digital Enhanced Cordless Telecommunications), 1G, 2G, 3G, 4G Cellular systems, IrDA, RFID (Radio Frequency Identification), Wireless USB, DSRC (Dedicated Short Range Communications), Near Field Communication, wireless sensor networks, ZigBee, EnOcean; Bluetooth, TransferJet, Ultra-wideband (UWB from WiMedia Alliance), WLAN, IEEE 802.11, WiFi, HiperLAN, Wireless Metropolitan Area Networks (WMAN) and Broadband Fixed Access (BWA) (LMDS, WiMAX, AIDAAS and HiperMAN), or the like.

Using the description provided herein, the embodiments may be implemented as a machine, process, or article of manufacture by using standard programming and/or engineering techniques to produce programming software, firmware, hardware or any combination thereof.

Any resulting program(s), having computer-readable program code, may be embodied on one or more computer-usable media such as resident memory devices, smart cards or other removable memory devices, or transmitting devices, thereby making a computer program product or article of manufacture according to the embodiments. As such, the terms "article of manufacture" and "computer program product" as used herein are intended to encompass a computer program that exists permanently or temporarily on any computer-usable non-transient medium.

As indicated above, memory/storage devices include, but are not limited to, disks, optical disks, removable memory devices such as smart cards, SIMs, WIMs, semiconductor memories such as RAM, ROM, PROMS, etc. Transmitting mediums include, but are not limited to, transmissions via wireless communication networks, the Internet, intranets, telephone/modem-based network communication, hard-wired/cabled communication network, satellite communication, and other stationary or mobile network systems/communication links.

Although specific example embodiments have been disclosed, a person skilled in the art will understand that changes can be made to the specific example embodiments without departing from the spirit and scope of the invention.

What is claimed is:

1. A method for low power position detection between relatively moving objects, for wireless location determination, comprising:

receiving, by a first transceiver of an apparatus having a first antenna array mounted on a moveable platform, from a remote device, one or more wireless Bluetooth Low Energy advertising packets modified to have an overall packet length with a first portion of the packet including a header and payload and a second portion of the packet being a direction finding extension containing angle of arrival information including a reference binary signal pattern in a continuous digital wave from the remote device, wherein the moveable platform is in motion relative to the remote device;

sampling, by a sampler and phase detector of the apparatus, the sampler configured to not process the header or payload of the first portion of the packet, but to sample the direction finding extension of the second portion of the packet, a first phase and amplitude of the reference binary signals in the received pattern in the continuous digital wave in the direction finding extension of the second portion of the packet;

decoding, by a decoder of the apparatus, the sampled reference binary signals and determining at least a first angle of arrival from the received angle of arrival information, wherein the first angle of arrival is determined when the apparatus is at a first location, using the first antenna array receiving the information packets;

sampling, by the sampler and phase detector of the apparatus, the sampler configured to not process the header or payload of the first portion of the packet, but to sample the direction finding extension of the second portion of the packet, a second phase and amplitude of the reference binary signals in the received pattern in the continuous digital wave in the direction finding extension of the second portion of the packet;

decoding, by the decoder of the apparatus, the sampled reference binary signals and determining at least a second angle of arrival from the received angle of arrival information, wherein the second angle of arrival is determined when the apparatus is at a second location, using the first antenna array receiving the information packets;

generating distance estimation data in the apparatus relative to the remote device, based on a separation distance between the first location and the second location, the determined first angle of arrival and second angle of arrival; and determining relative position of the apparatus and the remote device for location determination, based on the distance estimation data, the determined first angle of arrival and second angle of arrival.

2. The method of claim 1, further comprising:
calculating distance estimation data based on a difference between the first angle of arrival and second angle of arrival.

3. A method for low power position detection between relatively moving objects, for wireless location determination, comprising:

receiving, by a first transceiver of an apparatus having a first antenna array mounted on a moveable platform, from a remote device, one or more wireless Bluetooth Low Energy advertising packets modified to have an overall packet length with a first portion of the packet including a header and payload and a second portion of the packet being a direction finding extension containing angle of arrival information including a reference binary signal pattern in a continuous digital wave from the remote device;

sampling, by a sampler and phase detector of the apparatus, the sampler configured to not process the header or payload of the first portion of the packet, but to sample the direction finding extension of the second portion of the packet, a first phase and amplitude of the reference binary signals in the received pattern in the continuous digital wave in the direction finding extension of the second portion of the packet;

decoding, by a decoder of the apparatus, the sampled reference binary signals and determining at least a first angle of arrival from the received angle of arrival information, wherein the first angle of arrival is determined using the first antenna array receiving the information packets;

receiving, by a second transceiver of the apparatus having a second antenna array mounted on the moveable platform, from the remote device, the one or more wireless packets including information packets containing the angle of arrival information including the reference binary signal pattern from the remote device, wherein the second transceiver is spatially separate from the first transceiver;

sampling, by the sampler and phase detector of the apparatus, the sampler configured to not process the header or payload of the first portion of the packet, but to sample the direction finding extension of the second portion of the packet, a second phase and amplitude of the reference binary signals in the received pattern in the continuous digital wave in the direction finding extension of the second portion of the packet;

decoding, by the decoder of the apparatus, the sampled reference binary signals and determining a second angle of arrival from the received angle of arrival information, wherein the second angle of arrival is determined using the second antenna array receiving the information packets;

calculating distance estimation data based on a separation distance between the first transceiver and the second transceiver, a difference between the first angle of arrival and second angle of arrival; and determining relative position of the apparatus and the remote device for location determination, based on the distance estimation data, the determined first angle of arrival and second angle of arrival.

4. The method of claim 3, further comprising:
calculating distance estimation data based on a difference between the first angle of arrival and second angle of arrival and geographical coordinates obtained from a sensor.

5. The method of claim 3, further comprising:
calculating distance estimation data based on a difference between the first angle of arrival and second angle of arrival and geographical coordinates obtained from a database.

6. An apparatus for low power position detection between relatively moving objects, for wireless location determination, comprising:

at least one processor;
at least one memory including computer program code;
the at least one memory and the computer program code configured to, with the at least one processor, cause the apparatus at least to:

receive, by a first transceiver of the apparatus having a first antenna array mounted on a moveable platform, from a remote device, one or more wireless Bluetooth Low Energy advertising packets modified to have an overall packet length with a first portion of the packet including a header and payload and a second portion of the packet being a direction finding extension containing angle of arrival information including a reference binary signal pattern in a continuous digital wave from the remote device, wherein the moveable platform is in motion relative to the remote device;

sample, by a sampler and phase detector of the apparatus, the sampler configured to not process the header or payload of the first portion of the packet, but to sample the direction finding extension of the second portion of the packet, a first phase and amplitude of the reference binary signals in the received pattern in the continuous digital wave in the direction finding extension of the second portion of the packet;

decode, by a decoder of the apparatus, the sampled reference binary signals and determine at least a first angle of arrival from the received angle of arrival information, wherein the first angle of arrival is determined when the apparatus is at a first location, using the first antenna array receiving the information packets;

sample, by the sampler and phase detector of the apparatus, the sampler configured to not process the header or payload of the first portion of the packet, but to sample the direction finding extension of the second portion of the packet, a second phase and amplitude of the reference binary signals in the received pattern in the continuous digital wave in the direction finding extension of the second portion of the packet;

decode, by the decoder of the apparatus, the sampled reference binary signals and determine at least a second angle of arrival from the received angle of arrival information, wherein the second angle of arrival is determined when the apparatus is at a second location, using the first antenna array receiving the information packets;

generate distance estimation data in the apparatus relative to the remote device, based on a separation distance between the first location and the second location, the determined first angle of arrival and second angle of arrival; and determine relative position of the apparatus and the remote device for location determination, based on the distance estimation data, the determined first angle of arrival and second angle of arrival.

7. The apparatus of claim 6, further comprising:

the at least one memory and the computer program code configured to, with the at least one processor, cause the apparatus at least to:

calculate distance estimation data based on a difference between the first angle of arrival and second angle of arrival.

8. An apparatus for low power position detection between relatively moving objects, for wireless location determination, comprising:

at least one processor;

at least one memory including computer program code;

the at least one memory and the computer program code configured to, with the at least one processor, cause the apparatus at least to:

receive, by a first transceiver of the apparatus having a first antenna array mounted on a moveable platform, from a remote device, one or more wireless Bluetooth Low Energy advertising packets modified to have an overall packet length with a first portion of the packet including a header and payload and a second portion of the packet being a direction finding extension containing angle of arrival information including a reference binary signal pattern in a continuous digital wave from the remote device;

sample, by a sampler and phase detector of the apparatus, the sampler configured to not process the header or payload of the first portion of the packet, but to sample the direction finding extension of the second portion of the packet, a first phase and amplitude of the reference binary signals in the received pattern in the continuous digital wave in the direction finding extension of the second portion of the packet;

decode, by a decoder of the apparatus, the sampled reference binary signals and determine at least a first angle of arrival from the received angle of arrival information, wherein the first angle of arrival is determined using the first antenna array receiving the information packets;

receive, by a second transceiver of the apparatus having a second antenna array mounted on the moveable platform, from the remote device, the one or more wireless packets including information packets containing the angle of arrival information including the reference binary signal pattern from the remote device, wherein the second transceiver is spatially separate from the first transceiver;

sample, by the sampler and phase detector of the apparatus, the sampler configured to not process the header or payload of the first portion of the packet, but to sample the direction finding extension of the second portion of the packet, a second phase and amplitude of the reference binary signals in the received pattern in the continuous digital wave in the direction finding extension of the second portion of the packet;

decode, by the decoder of the apparatus, the sampled reference binary signals and determine a second angle of arrival from the received angle of arrival information, wherein the second angle of arrival is determined using the second antenna array receiving the information packets;

calculate distance estimation data based on a difference between a separation distance between the first transceiver and the second transceiver, the first angle of arrival and second angle of arrival; and determine relative position of the apparatus and the remote device for location determination, based on the distance estimation data, the determined first angle of arrival and second angle of arrival.

9. The apparatus of claim 8, further comprising:

calculating distance estimation data based on a difference between the first angle of arrival and second angle of arrival and geographical coordinates obtained from a sensor.

10. The apparatus of claim 8, further comprising:

calculating distance estimation data based on a difference between the first angle of arrival and second angle of arrival and geographical coordinates obtained from a database.

11. A computer program product for low power position detection between relatively moving objects, for wireless location determination, comprising computer executable program code recorded on a computer readable non-transitory storage medium, the computer executable program code comprising:

code for receiving, by a first transceiver of an apparatus having a first antenna array mounted on a moveable platform, from a remote device, one or more wireless Bluetooth Low Energy advertising packets modified to have an overall packet length with a first portion of the packet including a header and payload and a second portion of the packet being a direction finding extension containing angle of arrival information including a reference binary signal pattern in a continuous digital wave from the remote device, wherein the moveable platform is in motion relative to the remote device;

code for sampling, by a sampler and phase detector of the apparatus, the sampler configured to not process the header or payload of the first portion of the packet, but to sample the direction finding extension of the second portion of the packet, a first phase and amplitude of the reference binary signals in the received pattern in the continuous digital wave in the direction finding extension of the second portion of the packet;

code for decoding, by a decoder of the apparatus, the sampled reference binary signals and determining at least a first angle of arrival from the received angle of arrival information, wherein the first angle of arrival is determined when the apparatus is at a first location, using the first antenna array receiving the information packets;

code for sampling, by the sampler and phase detector of the apparatus, the sampler configured to not process the header or payload of the first portion of the packet, but to sample the direction finding extension of the second portion of the packet, a second phase and amplitude of the reference binary signals in the received pattern in the continuous digital wave in the direction finding extension of the second portion of the packet;

code for decoding, by the decoder of the apparatus, the sampled reference binary signals and determining at least a second angle of arrival from the received angle of arrival information, wherein the second angle of arrival is determined when the apparatus is at a second location, using the first antenna array receiving the information packets;

code for generating by a computer in the apparatus executing computer executable program code, distance estimation data in the apparatus relative to the remote device, based on a separation distance between the first location and the second location, the determined first angle of arrival and second angle of arrival; and code for determining by a computer in the apparatus executing computer executable program code, relative position of the apparatus and the remote device for location determination, based on the distance estimation data, the determined first angle of arrival and second angle of arrival.

12. The computer program product of claim 11, further comprising:

code for calculating distance estimation data based on a difference between the first angle of arrival and second angle of arrival.

13. A computer program product for low power position detection between relatively moving objects, for wireless location determination, comprising computer executable program code recorded on a computer readable non-transitory storage medium, the computer executable program code comprising:

code for receiving, by a first transceiver of an apparatus having a first antenna array mounted on a moveable platform, from a remote device, one or more wireless Bluetooth Low Energy advertising packets modified to have an overall packet length with a first portion of the packet including a header and payload and a second portion of the packet being a direction finding extension containing angle of arrival information including a reference binary signal pattern in a continuous digital wave from the remote device;

code for sampling, by a sampler and phase detector of the apparatus, the sampler configured to not process the header or payload of the first portion of the packet, but to sample the direction finding extension of the second portion of the packet, a first phase and amplitude of the reference binary signals in the received pattern in the continuous digital wave in the direction finding extension of the second portion of the packet;

code for decoding, by a decoder of the apparatus, the sampled reference binary signals and determining at least a first angle of arrival from the received angle of arrival information, wherein the first angle of arrival is determined using the first antenna array receiving the information packets;

code for receiving, by a second transceiver of the apparatus having a second antenna array mounted on the moveable platform, from the remote device, the one or more wireless packets including information packets containing the angle of arrival information including the reference binary signal pattern from the remote device, wherein the second transceiver is spatially separate from the first transceiver;

code for sampling, by the sampler and phase detector of the apparatus, the sampler configured to not process the header or payload of the first portion of the packet, but to sample the direction finding extension of the second portion of the packet, a second phase and amplitude of the reference binary signals in the received pattern in the continuous digital wave in the direction finding extension of the second portion of the packet ;

code for decoding, by the decoder of the apparatus, the sampled reference binary signals and determining a second angle of arrival from the received angle of arrival information, wherein the second angle of arrival is determined using the second antenna array receiving the information packets;

code for calculating by a computer in the apparatus executing computer executable program code, distance estimation data based on a separation distance between the first transceiver and the second transceiver, a difference between the first angle of arrival and second angle of arrival; and code for determining by a computer in the apparatus executing computer executable program code, relative position of the apparatus and the remote device for location determination, based on the distance estimation data, the determined first angle of arrival and second angle of arrival.

* * * * *